United States Patent
Han et al.

(10) Patent No.: US 11,968,580 B2
(45) Date of Patent: *Apr. 23, 2024

(54) REFLECTIVE QOS FLOW CHARACTERISTIC-BASED COMMUNICATIONS METHOD AND APPARATUS

(71) Applicant: GUANGDONG OPPO MOBILE TELECOMMUNICATIONS CORP., LTD., Dongquan (CN)

(72) Inventors: Lifeng Han, Shenzhen (CN); Hongping Zhang, Shenzhen (CN); Qinghai Zeng, Shanghai (CN); Qufang Huang, Shenzhen (CN); Yinghao Guo, Shanghai (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 278 days.

This patent is subject to a terminal disclaimer.

(21) Appl. No.: 17/486,654

(22) Filed: Sep. 27, 2021

(65) Prior Publication Data

US 2022/0124584 A1    Apr. 21, 2022

Related U.S. Application Data

(63) Continuation of application No. 16/566,638, filed on Sep. 10, 2019, now Pat. No. 11,159,998, which is a
(Continued)

(30) Foreign Application Priority Data

May 5, 2017   (CN) .......................... 201710313900.5
Jun. 16, 2017 (CN) .......................... 201710458757.9

(51) Int. Cl.
*H04W 36/08* (2009.01)
*H04W 36/30* (2009.01)
(Continued)

(52) U.S. Cl.
CPC ........... *H04W 36/08* (2013.01); *H04W 36/30* (2013.01); *H04W 68/005* (2013.01); *H04W 76/11* (2018.02); *H04W 80/08* (2013.01)

(58) Field of Classification Search
CPC . H04W 36/08; H04W 36/30; H04W 36/0044; H04W 68/005; H04W 76/11; H04W 80/08; H04W 28/24; H04L 5/0053
See application file for complete search history.

(56) References Cited

U.S. PATENT DOCUMENTS

| 2014/0233380 A1 | 8/2014 | Kim et al. |
| 2016/0029235 A1 | 1/2016 | Kim et al. |

(Continued)

FOREIGN PATENT DOCUMENTS

| CN | 103209410 | 7/2013 |
| CN | 103581047 A | 2/2014 |

(Continued)

OTHER PUBLICATIONS

First Office Action issued in corresponding Vietnamese application No. 1-2019-04897, dated Aug. 31, 2022.
(Continued)

*Primary Examiner* — Hashim S Bhatti
*Assistant Examiner* — Hector Reyes
(74) *Attorney, Agent, or Firm* — BAYES PLLC

(57) ABSTRACT

This application provides a reflective QoS flow characteristic-based communications method and apparatus. In the method, an access-network network element sends first information to a core-network network element, where the first information is used to indicate whether a data packet has
(Continued)

a reflective QoS flow characteristic; and the access-network network element determines, based on the first information, whether there is a need to send a QoS flow identifier to a terminal. In this way, signaling overheads are reduced.

18 Claims, 16 Drawing Sheets

Related U.S. Application Data continuation of application No. PCT/CN2018/085867, filed on May 7, 2018.

(51) Int. Cl.
*H04W 68/00* (2009.01)
*H04W 76/11* (2018.01)
*H04W 80/08* (2009.01)

(56) References Cited

U.S. PATENT DOCUMENTS

| | | | |
|---|---|---|---|
| 2016/0142321 | A1 | 5/2016 | Gage |
| 2017/0034688 | A1 | 2/2017 | Kim et al. |
| 2018/0098334 | A1 | 4/2018 | Tie et al. |
| 2018/0234876 | A1* | 8/2018 | Jheng .................... H04W 28/26 |
| 2018/0279160 | A1* | 9/2018 | Sayenko ............. H04W 88/023 |
| 2018/0279193 | A1 | 9/2018 | Park et al. |
| 2018/0324631 | A1* | 11/2018 | Jheng .................... H04L 5/0055 |
| 2019/0253942 | A1 | 8/2019 | Yoo et al. |
| 2019/0261240 | A1 | 8/2019 | Fang et al. |
| 2019/0357075 | A1 | 11/2019 | van der Velde et al. |
| 2019/0357093 | A1* | 11/2019 | Xu .................... H04W 36/0058 |
| 2020/0077317 | A1* | 3/2020 | Sharma ............. H04W 36/0005 |
| 2020/0389826 | A1 | 12/2020 | Park et al. |

FOREIGN PATENT DOCUMENTS

| | | |
|---|---|---|
| CN | 104301251 | 1/2015 |
| CN | 106304374 | 1/2017 |
| GB | 2559840 | 8/2018 |
| JP | 2016533134 | 10/2016 |

OTHER PUBLICATIONS

First Office Action issued in corresponding Chinese application No. 201710458757.9, dated Jan. 10, 2023.
3GPP TS 38.323 Vx.y.z (yyyy-mm), 3rd Generation Partnership Project; Technical Specification Group Radio Access Network; [5G NR]; Packet Data Convergence Protocol (PDCP) specification(Release 15), Apr. 2017, 8 pages.
3GPP TS 38.331 V0.0.2 (Mar. 2017), 3rd Generation Partnership Project; Technical Specification Group Radio Access Network; NR; Radio Resource Control (RRC); Protocol specification(Release 15), 13 pages.
3GPP TS 38.413 V0.0.2 (May 2017), 3rd Generation Partnership Project; Technical Specification Group Radio Access Network; NG Radio Access Network(NG-RAN);NG Application Protocol (NGAP)(Release 15), 39 pages.
Alcatel-Lucent, Alcatel-Lucent Shanghai Bell, "PRACH for LC-MTC." 3GPP TSG RAN WG1 Meeting #80bis Belgrade, Serbia, Apr. 20-24, 2015, R1-151234, 4 pages.
Ericsson, "Reflective QoS and Flow-ID" 3GPP TSG-RAN WG2 #98 Hangzhou, China, May 15-19, 2017, R2-1704379, 6 pages.
Extended European Search Report issued in European Application No. 18794574.6 dated Feb. 3, 2020, 7 pages.
Extended European Search Report issued in European Application No. 21152968.0 dated Aug. 25, 2021, 10 pages.
Huawei et al., "QoS Flow to DRB Re-Mapping," 3GPP TSG-RAN2 Meeting #97bis, R2-1702614, Spokane, Washington, USA, Apr. 3-7, 2017, 6 pages.
Huawei, "Reflective QoS Impacts on RAN," 3GPP TSG-RAN WG3 NR Ad Hoc, R3-172167, Qingdao, China, Jun. 27-29, 2017, 3 pages.
Itri, MediaTek Inc., "Discussion on omitting QoS flow ID" 3GPP TSG-RAN WG2 Meeting #97bis, Spokane, USA, Apr. 3-7, 2017, R2-1703145, 2 pages.
Itri, MediaTek Inc., Discussion on omitting QoS flow ID. 3GPP TSG-RAN WG2 Meeting #98 Hangzhou, China, May 15-19, 2017, R2-1705113, 2 pages.
LG Electronics Inc, "Configurability for UL QoS flow ID marking", 3GPP Draft TSG-RAN2 Meeting #98, R2-1704469, May 15-19, 2017, 4 pages.
LG Electronics Inc, "Further considerations on QoS flow ID," 3GPP Draft TSG-RAN2 Meeting #98, R2-1704472, May 15-19, 2017, 2 pages.
LG Electronics Inc, "SDAP configuration", 3GPP Draft TSG-RAN2 Meeting #98, R2-1704474, May 15-19, 2017, 2 pages.
LG Electronics Inc., "QoS flow to DRB remapping," 3GPP TSG-RAN2 Meeting #98, R2-1704552, Hangzhou, China, May 15-19, 2017, 3 pages.
Nokia, Alcatel-Lucent Shanghai Bell, "QoS Flow Marking." 3GPP TSG-RAN WG2 Meeting #97 Athens, Greece, Feb. 13-17, 2017, R2-1700810, 3 pages.
Office Action issued in Chinese Application No. 201811034977.X dated May 29, 2019, 17 pages (With English Translation).
Office Action issued in Indian Application No. 201927033155 dated Oct. 28, 2020, 7 pages.
Office Action issued in Japanese Application No. 2019-551302 dated Oct. 26, 2020, 5 pages (with English translation).
PCT International Search Report and Written Opinion in International Application No. PCT/CN2018/085,867, dated Jul. 27, 2018, 13 pages (With Partial English Translation).
ZTE et al., "WF on NB-RS for NB-IoT." 3GPP TSG RAN WG1 #84 meeting St. Julian, Malta, Feb. 15-19, 2016, R1-161234, 3 pages.

* cited by examiner

| NRQI | ARQI | R | Oct 1 |
| QFI | | | Oct 2 |
| QFI | | | Oct 3 |
| Data | | | Oct 4 |
| ... | | | |
| | | | Oct N |

REFLECTIVE QOS FLOW CHARACTERISTIC-BASED COMMUNICATIONS METHOD AND APPARATUS

CROSS-REFERENCE TO RELATED APPLICATIONS

This application is a continuation of U.S. patent application Ser. No. 16/566,638, filed on Sep. 10, 2019, which is a continuation of International Application No. PCT/CN2018/085867, filed on May 7, 2018, which claims priority to Chinese Patent Application No. 201710313900.5, filed on May 5, 2017 and to Chinese Patent Application No. 201710458757.9, filed on Jun. 16, 2017, All of the aforementioned patent applications are hereby incorporated by reference in their entireties.

TECHNICAL FIELD

This application relates to the field of communications technologies, and in particular, to a reflective QoS flow characteristic-based communications method and apparatus.

BACKGROUND

In a next-generation communications system, a flow-based quality of service (QoS) architecture is proposed.

The flow-based QoS architecture mainly includes quality of service flow (QoS flow) mapping in a non-access stratum (NAS) and an access stratum (AS). QoS flows are data flows in a packet data unit (PDU) session that have a same QoS requirement, and may also be understood as a plurality of Internet Protocol (IP) flows that have a same QoS requirement or a group of data packets of another type that have a same QoS requirement. The NAS layer is mainly responsible for a mapping relationship between a QoS flow and an IP flow or another type of data packets. A core network user plane function (UPF) generates a downlink QoS flow, and a terminal generates an uplink QoS flow. The AS layer is mainly responsible for a mapping relationship between a QoS flow and a data radio bearer (DRB). A network side (such as a base station) configures the mapping relationship between a QoS flow and a DRB, and provides, in an air-interface DRB, a QoS service for a QoS flow.

In a fifth-generation communications system (5G), a reflective QoS characteristic is further introduced into the flow-based QoS architecture. The reflective QoS characteristic means that a QoS flow is symmetrical in terms of uplink and downlink. To be specific, QoS of an uplink flow is the same as QoS of a downlink flow, and an uplink packet filtering template and a downlink packet filtering template are also symmetrical. For example, an uplink source address is a downlink destination address, an uplink source port number is a downlink destination port number, an uplink destination address is a downlink source address, and an uplink destination port number is a downlink source port number.

In a reflective QoS characteristic-based communication process, to save control signaling, the network side does not notify, by using signaling, a terminal of a rule for mapping an uplink IP flow or another type of data packets to a QoS flow, but implicitly notifies the terminal of the rule by using a downlink data packet. After receiving a downlink data packet having the reflective QoS characteristic, the terminal reverses an information quintuple in a header of the downlink data packet to obtain an uplink packet filter. In addition, a QoS parameter index value corresponding to the uplink packet filter is a QoS parameter index value carried in the header of the downlink packet. Therefore, the terminal can obtain uplink QoS information such as a packet filter and a QoS flow identifier (id) without receiving a NAS signaling notification.

In the foregoing manner, although the terminal can receive control signaling, the terminal needs to detect header information of each received downlink data packet, so as to determine whether the received downlink data packet has the reflective QoS characteristic. However, in the 5G communications system, a data transmission rate is extremely high, and if the terminal detects each downlink data packet, extremely large overheads are caused, affecting performance and power consumption of the terminal.

SUMMARY

Embodiments of this application provide a reflective QoS flow characteristic-based communications method and apparatus to reduce signaling overheads.

According to a first aspect, a reflective QoS flow characteristic-based communications method is provided. In the method, an access-network network element determines whether there is a need to send a QoS flow identifier (QoS flow ID) to a terminal. The access-network network element sends a QoS flow ID to the terminal when determining that there is a need to send the QoS flow ID to the terminal, or the access-network network element does not send a QoS flow ID when there is no need to send the QoS flow ID, so as to save signaling overheads.

In a possible design, a core-network network element sends first information to the access-network network element, where the first information is used to indicate whether a data packet has a reflective QoS characteristic. The access-network network element receives the first information sent by the core-network network element, and determines, based on the first information, whether there is a need to send a QoS flow ID to the terminal. The access-network network element may further send first indication information to the terminal, where the first indication information is used to indicate whether the terminal needs to read a QoS flow ID.

The core-network network element may be a core network control plane network element, such as an AMF. The access-network network element may be a base station, such as a gNB.

If a data packet has the reflective QoS characteristic, this means that the terminal can obtain an uplink QoS flow ID and packet filter based on the data packet in a reflective manner. If a data packet does not have the reflective QoS characteristic, this means that the terminal cannot obtain an uplink QoS flow ID and an uplink packet filter based on the data packet in a reflective manner.

In another possible design, the first information is further used to indicate a reflective QoS type of a data packet. The reflective QoS type of a data packet includes: all data packets have the reflective QoS characteristic, some data packets have the reflective QoS characteristic, or none of data packets have the reflective QoS characteristic.

The access-network network element may determine, based on the first information, whether a data packet has the reflective QoS characteristic, and determine, based on the reflective QoS type of a data packet, whether all data packets have the reflective QoS characteristic, some data packets have the QoS reflective QoS characteristic, or none of data packets have the reflective QoS characteristic. The access-network network element may also determine, based on the reflective QoS type of a data packet, whether a data packet has the reflective QoS characteristic.

In still another possible design, the first information may be reflective QoS information sent by the core network control plane network element, and the reflective QoS information is used to indicate whether a data packet has the reflective QoS characteristic. The core network control plane network element sends the reflective QoS information to the access-network network element. The access-network network element receives the reflective QoS information sent by the core network control plane network element, and determines, based on the reflective QoS information sent by the core network control plane network element, whether there is a need to send a QoS flow ID to the terminal.

When determining that a data packet has the reflective QoS characteristic, the access-network network element determines that there is a need to send a QoS flow ID to the terminal; or when determining that a data packet does not have the reflective QoS characteristic, the access-network network element determines that there is no need to send a QoS flow ID to the terminal, so as to save signaling overheads.

The reflective QoS information may be reflective QoS information of a QoS flow, or may be reflective QoS information of a PDU session.

In still another possible design, the core network control plane network element may further send reflective QoS information update indication information to the access-network network element, and the reflective QoS information update indication information is used to instruct the access-network network element device to update the received reflective QoS information.

In still another possible design, the access-network network element may determine a mapping relationship between a QoS flow and a DRB based on reflective QoS information of a QoS flow or a PDU session, for example, the access-network network element may map QoS flows that differ in the reflective QoS characteristic to different DRBs.

In still another possible design, the first indication information may be reflective QoS information sent by the access-network network element to the terminal. The access-network network element sends the reflective QoS information to the terminal. The terminal receives the reflective QoS information sent by the access-network network element, and determines, based on the reflective QoS information, whether there is a need to read a QoS flow ID.

The reflective QoS information sent by the access-network network element to the terminal may be reflective QoS information of a QoS flow, reflective QoS information of a DRB, or reflective QoS information of a PDU session (or an SDAP entity).

For a DRB, an SDAP entity, or a QoS flow that includes a data packet having the reflective QoS characteristic, the terminal detects a QoS flow ID and a data packet header, and generates an uplink QoS flow ID and a corresponding packet filter based on the detected QoS flow ID. However, for a DRB, an SDAP entity, or a QoS flow of a data packet that does not have the reflective QoS characteristic, the terminal may not detect a QoS flow ID and a data packet header, so as to save signaling overheads of the terminal.

In still another possible design, the first information may be a reflective QoS flow characteristic indicator (RQI) sent by a core network user plane network element, and the RQI is used to indicate that some data packets have the reflective QoS flow characteristic.

The core-network network element may not send the reflective QoS characteristic of a QoS flow to the access-network network element. After the access-network network element obtains an RQI by parsing a header of a data packet to be sent through an N3 interface, the access-network network element determines that the QoS flow has the reflective QoS characteristic and that some data packets have the reflective QoS characteristic, where the RQI is used to indicate that a data packet has the reflective QoS characteristic. Alternatively, for a QoS flow whose QoS parameter is standardized, the access-network network element may consider by default that the QoS flow has the reflective QoS characteristic and that some data packets have the reflective QoS characteristic.

In still another possible design, the core-network network element may send reflective QoS information deactivation indication information to the access-network network element. The reflective QoS information deactivation indication information is used to indicate reflective QoS deactivation information. The reflective QoS deactivation information means that a data packet having the reflective QoS characteristic as indicated by the reflective QoS information does not have the reflective QoS characteristic any longer. The access-network network element receives the reflective QoS information deactivation indication information sent by the core-network network element, deactivates the reflective QoS characteristic of a data packet based on the reflective QoS information deactivation indication information, and determines that there is no need to send a QoS flow ID for a data packet whose reflective QoS characteristic has been deactivated.

The reflective QoS deactivation information that the reflective QoS information deactivation indication information sent by the core-network network element to the access-network network element indicates may be reflective QoS deactivation information of a QoS flow, or may be reflective QoS deactivation information of a PDU session.

The reflective QoS information deactivation indication information may be used to indicate deactivation of the reflective QoS characteristic for one or more QoS flows or PDU sessions.

In still another possible design, the access-network network element may send reflective QoS information deactivation indication information to the terminal. Reflective QoS deactivation information that the reflective QoS information deactivation indication information sent by the access-network network element to the terminal indicates may be not only reflective QoS deactivation information of a QoS flow or a PDU session, but also reflective QoS deactivation information of a DRB. The terminal receives the reflective QoS information deactivation indication information sent by the access-network network element, and determines that there is no need to read a QoS flow ID of a data packet that does not have the reflective QoS characteristic any longer, so as to save signaling overheads.

In still another possible design, a decompression operation performed at a PDCP layer at a receive end of the terminal for robust header compression (ROHC) may be used to directly decompress a PDCP SDU from which a PDCP header is removed, and there is no need to perform an operation caused by an SDAP header, such as an initial decompression location offset operation, so that signaling overheads are saved.

In this embodiment of this application, the access-network network element notifies the terminal of reflective QoS information of a QoS flow, a DRB, or a PDU session, and may deactivate the reflective QoS characteristic of a QoS flow, a DRB, or a PDU session. The terminal may determine, based on the reflective QoS information, whether there is a need to read a QoS flow ID through an air interface and whether there is a need to perform an ROHC location offset operation. For a DRB that does not have the reflective QoS, the terminal does not detect a QoS flow ID, and does not perform an ROHC decompression location offset operation, so as to reduce detection work performed by the terminal for an air-interface data packet and reduce overheads, thereby improving processing efficiency and saving power.

In still another possible design, if cell handover for the terminal occurs, a source access-network network element (a source base station) that obtains the first information (the reflective QoS information) may send the obtained reflective QoS information to a target access-network network element (a target base station) to which the terminal is to be handed over, and the target access-network network element decides to perform one or more of the following operations: sending a QoS flow ID through the air interface, configuring whether the terminal needs to read a QoS flow ID, configuring, for the terminal, a manner of configuring a mapping relationship between a QoS flow and a DRB, deciding whether to configure an SDAP entity for a PDU session, and so on.

In still another possible design, the core-network network element may further send a QoS rule validity time to the access-network network element, and a QoS rule is effective in the QoS rule validity time. The access-network network element may send the QoS rule validity time to the terminal after receiving the QoS rule validity time, so that the terminal maps, in the QoS rule validity time by using a same QoS rule, data packets having the reflective QoS characteristic into a QoS flow.

The QoS rule validity time sent by the core-network network element to the access-network network element may be an effective reflective QoS rule validity time of a QoS flow, or may be an effective reflective QoS rule validity time of a PDU session.

In still another possible design, the core-network network element may further send QoS rule validity time update information to the access-network network element, and the QoS rule validity time update information is used to indicate an updated QoS rule validity time.

In still another possible design, if the access-network network element receives, in the QoS rule validity time, at least two data packets having the reflective QoS characteristic, the access-network network element may send, for some of the at least two data packets in the QoS rule validity time, the first information used to indicate whether a data packet has the reflective QoS characteristic, so as to filter the first information to be sent, thereby saving signaling overheads.

In still another possible design, the source access-network network element (the source base station) may send a QoS rule validity time of a data packet of a to-be-switched QoS flow to the target access-network network element (the target base station) to which the terminal is to be handed over. The target access-network network element may filter, based on the QoS rule validity time, the reflective QoS information to be sent to the terminal, so as to filter the reflective QoS information to be sent to the terminal, thereby saving signaling overheads.

The target access-network network element may ignore the QoS rule validity time of the data packet sent by the source access-network network element, so as to avoid QoS rule validity time synchronization between the source access-network network element and the target access-network network element.

The QoS rule validity time that may be sent by the source access-network network element to the target access-network network element to which the terminal is to be handed over may be a QoS rule validity time of a QoS flow, or may be a QoS rule validity time of a PDU session.

In still another possible design, a data packet of a QoS flow is transmitted by using a non-transparent-mode SDAP frame format or by using a transparent-mode SDAP frame format.

The transparent-mode SDAP frame format means that no SDAP header is configured for a DRB. In other words, an SDAP PDU does not include SDAP header. The non-transparent-mode SDAP frame format means that an SDAP header is configured for a DRB. In other words, an SDAP PDU includes the SDAP header.

In the non-transparent-mode SDAP frame format, if a bit used to indicate an NRQI and a bit used to indicate an ARQI both are set to 0, the SDAP header may not carry a QFI field. If at least one of the bit used to indicate the NRQI or the bit used to indicate the ARQI is set to 1, the SDAP header carries the QFI field.

In a data transmission process, an SDAP entity at a data receive end receives a PDCP SDU from a PDCP layer, and reads the SDAP header. If a value of the bit used to indicate the NRQI is 1, it indicates that the data packet has the reflective QoS characteristic. In this case, the SDAP entity delivers, to an upper layer such as a NAS layer, a data portion of SDAP and a QoS flow ID that is read from the SDAP header. The data portion and the QoS flow ID that are delivered to the upper layer may be used to generate a QoS rule at the upper layer. Further, the SDAP entity may send the NRQI to the upper layer.

In the non-transparent-mode SDAP frame format, the SDAP header further includes a bit used to indicate a URQI.

In the non-transparent-mode SDAP frame format, a bit is set in the SDAP header, where the bit is used to indicate whether transmission, in a corresponding DRB, of a data packet of a QoS flow ends. For example, an End field is set.

In the non-transparent-mode SDAP frame format, a control command may be set in the SDAP header, where the control command is used to feed back completion of receiving, in a DRB, of a data packet of a QoS flow.

In still another possible design, an SDAP transparent mode may be unidirectionally set. The SDAP transparent mode is configured in a downlink direction of at least one DRB, or the SDAP transparent mode is configured in an uplink direction of at least one DRB.

In still another possible design, in a data transmission process, the access-network network element may send SDAP mode information to the terminal. The SDAP mode information is used to indicate whether an SDAP frame format is in a transparent mode or a non-transparent mode, and indicate a direction corresponding to an SDAP mode.

The source access-network network element (the source base station) may send the SDAP mode information to the target access-network network element (the target base station) to which the terminal is to be handed over.

According to a second aspect, an access-network network element may filter a to-be-sent QoS flow ID. When determining that a header of a data packet to be sent to a terminal needs to carry a QoS flow ID, the QoS flow ID is included in the header of the data packet; or when determining that a header of a data packet to be sent to a terminal does not need to carry a QoS flow ID, the QoS flow ID is not included in the header of the data packet, so as to decrease a quantity of QoS flow IDs to be sent through an air interface, thereby saving signaling overheads.

In a possible design, the access-network network element determines data packet header information, and determines, based on the data packet header information, whether there is a need to add a QoS flow ID to the header of the data packet to be sent to the terminal.

In a possible design, a core-network network element sends reflective QoS information and packet filter composition information to the access-network network element. The packet filter composition information may be packet filter composition information corresponding to a reflective QoS characteristic of a QoS flow or a PDU session. For example, the packet filter composition information may be an IP quintuple (a source address, a destination address, a source port number, a destination port number, and a protocol number), or a Media Access Control (MAC) source address or an MAC destination address.

The access-network network element receives the reflective QoS information and the packet filter composition information that are sent by the core-network network element. The access-network network element determines, based on the corresponding packet filter composition information in the header of the data packet, whether there is a need to add a QoS flow ID to the header of the data packet to be sent to the terminal. For example, the access-network network element detects a header of each received data packet of a QoS flow based on packet filter composition. If a part that is in the header of the data packet and corresponds to a packet filter is new content, a QoS flow ID is carried in the data packet to be sent through an air interface. If the part that is in the header of the data packet and corresponds to the packet filter is not new, a QoS flow ID is not carried in the data packet to be sent through an air interface.

Further, the access-network network element may also determine whether there is a need to add, to the header of the data packet to be sent to the terminal, indication information used to indicate that the data packet has a reflective QoS characteristic. For example, the access-network network element detects a header of each received data packet of a QoS flow based on packet filter composition. If the part that is in the header of the data packet and corresponds to the packet filter is new content, the indication information may be further carried to indicate that the data packet has the reflective QoS characteristic. If the part that is in the header of the data packet and corresponds to a packet filter is not new, the indication information used to indicate that the data packet has the reflective QoS characteristic is not carried.

In another possible design, if the access-network network element determines that there is a need to add a QoS flow ID to the header of the data packet to be sent to the terminal, the access-network network element sends a user plane control PDU (such as an SDAP control PDU or a PDCP control PDU) or RRC signaling (including but not limited to an RRC configuration message, an RRC reconfiguration message, or the like) to the terminal. The user plane control PDU and the RRC signaling both include a QoS flow ID of the data packet and header information of the data packet.

In still another possible design, if the access-network network element determines that there is a need to add a QoS flow ID to the header of the data packet to be sent to the terminal, the access-network network element performs, based on the packet filter composition information, a reflective operation on content that is in the header of the data packet and corresponds to the packet filter composition information, so as to obtain an uplink packet filter. The access-network network element sends the uplink packet filter and the QoS flow ID to the terminal, and the terminal receives the QoS flow ID and the corresponding uplink packet filter to generate an uplink QoS flow.

In still another possible design, the terminal may send first capability information to the access-network network element; or the access-network network element may send first capability information to the core-network network element, and the core-network network element receives the first capability information and sends the first capability information to the access-network network element. The first capability information is used to indicate whether the terminal has at least one of a capability of reading a QoS flow ID and a capability of generating an uplink packet filter. The capability of reading a QoS flow ID is a capability of obtaining, by the terminal, a QoS flow ID from a received air-interface data packet. The capability of generating an uplink packet filter is a capability of generating, by the terminal, an uplink packet filter based on a received downlink air-interface data packet. The access-network network element receives the first capability information. If the access-network network element determines, based on the first capability information, that a capability or a status of the terminal does not support reading of a QoS flow ID and generating of an uplink packet filter, the access-network network element notifies, by using a user plane control PDU or RRC signaling, the terminal of a QoS flow ID and an uplink packet filter corresponding to the QoS flow ID. The access-network network element may notify, by using the user plane control PDU or the RRC signaling, the terminal of the QoS flow ID and the uplink packet filter corresponding to the QoS flow ID, so as to reduce overheads of the terminal and reduce overheads caused if the QoS flow ID is carried through an air interface.

In still another possible design, the terminal may further send second capability information to the access-network network element; or the terminal may send second capability information to the core-network network element, and the core-network network element sends the second capability information to the access-network network element. The second capability information is used to indicate whether the terminal has a reflective mapping capability. The reflective mapping capability is a capability of obtaining, by the terminal, a mapping relationship between an uplink QoS flow and a DRB based on a QoS flow ID carried in a header of a downlink data packet. The access-network network element receives the second capability information sent by the terminal. If the access-network network element determines that the terminal does not support the reflective mapping capability, the access-network network element needs to configure, for the terminal in another manner, the mapping relationship between an uplink QoS flow and a DRB, for example, configure the mapping relationship between an uplink QoS flow and a DRB by using RRC signaling.

According to a third aspect, a reflective QoS flow characteristic-based communications apparatus is provided, and the reflective QoS flow characteristic-based communications apparatus has functions of implementing the access-network network element in the first aspect and the second aspect. The functions may be implemented by using hardware, or may be implemented by executing corresponding software by hardware. The hardware or the software includes one or more modules corresponding to the foregoing functions. The module may be software and/or hardware.

In a possible design, the reflective QoS flow characteristic-based communications apparatus includes a receiving unit and a processing unit, and may further include a transmitting unit. Functions of the receiving unit, the processing unit, and the transmitting unit may correspond to the foregoing method steps. Details are not described herein again.

According to a fourth aspect, a reflective QoS flow characteristic-based communications apparatus is provided, and the reflective QoS flow characteristic-based communications apparatus has functions of implementing the core-network network element in the first aspect and the second aspect. The functions may be implemented by using hardware, or may be implemented by executing corresponding software by hardware. The hardware or the software includes one or more modules corresponding to the foregoing functions. The module may be software and/or hardware.

In a possible design, the reflective QoS flow characteristic-based communications apparatus includes a processing unit and a transmitting unit, and functions of the processing unit and the transmitting unit may correspond to the foregoing method steps. Details are not described herein again.

According to a fifth aspect, a reflective QoS flow characteristic-based communications apparatus is provided, and the reflective QoS flow characteristic-based communications apparatus has functions of implementing the terminal in the first aspect and the second aspect. The functions may be implemented by using hardware, or may be implemented by executing corresponding software by hardware. The hardware or the software includes one or more modules corresponding to the foregoing functions. The module may be software and/or hardware.

In a possible design, the reflective QoS flow characteristic-based communications apparatus includes a receiving unit and a processing unit, and functions of the receiving unit and the processing unit may correspond to the foregoing method steps. Details are not described herein again.

According to a sixth aspect, an access-network network element is provided, and the access-network network element includes a processor, a memory, a bus system, a receiver, and a transmitter. The processor, the memory, the receiver, and the transmitter are connected to each other by using the bus system. The memory is configured to store an instruction. The processor is configured to execute the instruction stored in the memory, to control the receiver to receive a signal and control the transmitter to send a signal, so as to complete execution functions of the access-network network element in the first aspect, the second aspect, and any possible design of the foregoing aspects.

According to a seventh aspect, a core-network network element is provided, and the core-network network element includes a processor, a memory, a bus system, and a transmitter. The processor, the memory, and the transmitter are connected to each other by using the bus system. The memory is configured to store an instruction. The processor is configured to execute the instruction stored in the memory, to control the transmitter to send a signal, so as to complete execution functions of the core-network network element in the first aspect, the second aspect, and any possible design of the foregoing aspects.

According to an eighth aspect, a terminal is provided, and the terminal includes a transmitter, a receiver, a processor, and a memory, and may further include an antenna. The transmitter, the receiver, the processor, and the memory may be connected to each other by using the bus system. The memory is configured to store an instruction. The processor is configured to execute the instruction stored in the memory, to control the receiver to receive a signal and control the transmitter to send a signal, so as to complete execution functions of the terminal in the first aspect, the second aspect, and any possible design of the foregoing aspects.

According to a ninth aspect, a communications system is provided, including the access-network network element in the sixth aspect, the core-network network element in the seventh aspect, and one or more terminals in the eighth aspect.

According to a tenth aspect, a computer storage medium is provided. The computer storage medium is configured to store some instructions. When these instructions are executed, any method related to the terminal, the access-network network element, or the core-network network element in the first aspect, the second aspect, and any possible design of the foregoing aspects may be completed.

According to an eleventh aspect, a computer program product is provided. The computer program product is configured to store a computer program, and the computer program is used to perform the communications method in the first aspect, the second aspect, and any possible design of the foregoing aspects.

In the embodiments of this application, the access-network network element determines whether there is a need to send a QoS flow ID to the terminal. The access-network network element sends a QoS flow ID to the terminal when determining that there is a need to send the QoS flow ID to the terminal, or the access-network network element does not send a QoS flow ID when there is no need to send the QoS flow ID, so as to save signaling overheads. Further, the access-network network element may filter a to-be-sent QoS flow ID. A QoS flow ID is not included in a header of a data packet to be sent to the terminal, when determining that there is a need to add the QoS flow ID to the header of the data packet; or a QoS flow ID is included in a header of a data packet to be sent to the terminal, when there is no need to add the QoS flow ID to the header of the data packet, so as to save signaling overheads.

DESCRIPTION OF EMBODIMENTS

Figure 1:
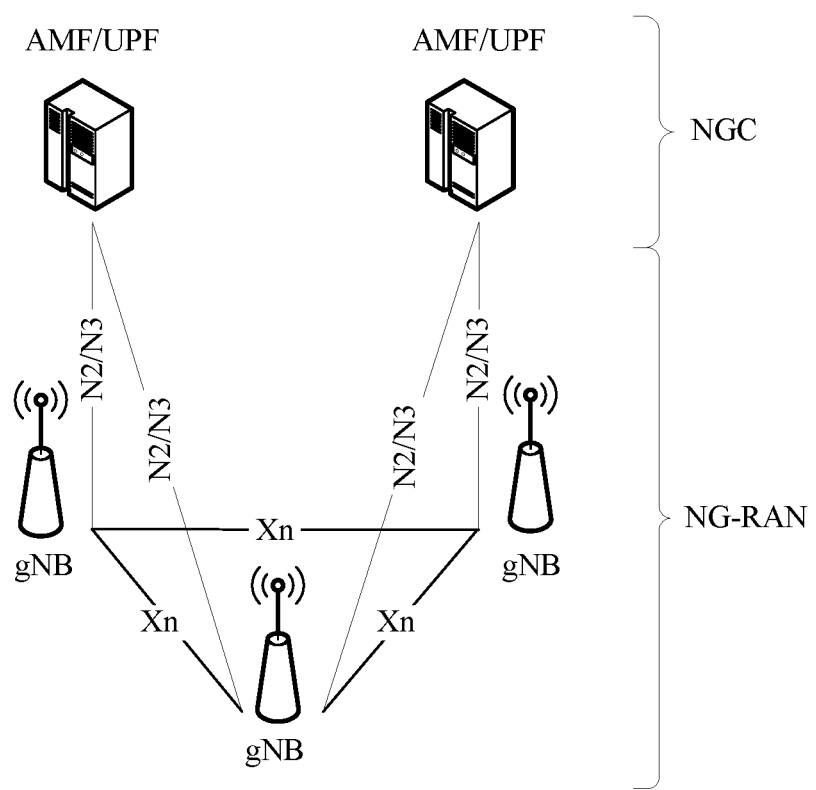
FIG. 1 is an architectural diagram of a communications system to which an embodiment of this application is applicable.

The following describes the technical solutions in the embodiments of this application with reference to the accompanying drawings.

Some terms in this application are first explained and described to facilitate understanding by a person skilled in the art.

(1). A base station (BS), which may also be referred to as a base station device, is an apparatus deployed in a radio access network to provide a wireless communications function. For example, in a 2G network, devices that provide a base station function include a base transceiver station (BTS) and a base station controller (BSC). In a 3G network, devices that provide a base station function include a NodeB and a radio network controller (RNC). In a 4G network, devices that provide a base station function include an evolved NodeB (eNB). In a wireless local area network (WLAN), a device that provides a base station function is an access point (AP). In a future 5G new radio (NR), a device that provides a base station function includes a continuously evolved NodeB (gNB).

(2). A terminal is a device that provides voice and/or data connectivity for a user, and may include a handheld device, an in-vehicle device, a wearable device, or a computing device that has a wireless communication function, or another processing device connected to a wireless modem, and user equipment (UE) in various forms, a mobile station (MS), a terminal device (Terminal Equipment), a transmission point (transmission and receiver point (TRP); or transmission point (TP)), or the like.

(3). Exchange: "Exchange" in this application is a process in which two exchanging parties transfer information to each other. The transferred information herein may be the same or different. For example, the two exchanging parties are a base station 1 and a base station 2. The base station 1 may request information from the base station 2, and the base station 2 provides the information requested by the base station 1 to the base station 1. Certainly, the base station 1 and the base station 2 may request information from each other. The requested information herein may be the same or different.

(4). "A plurality of" is two or more than two. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

(5). Terms "network" and "system" are usually interchangeably used, but meanings of the terms can be understood by a person skilled in the art. Information, signal, message, and channel may be interchangeably used sometimes. It should be pointed out that expressed meanings are consistent when differences are not emphasized. "Of", "relevant)", and "corresponding" may be interchangeably used sometimes. It should be pointed out that expressed meanings are consistent when differences are not emphasized.

(6). A protocol data unit (PDU) session may be understood as a link that provides a PDU link service between a terminal and a data network (DN).

(7). QoS flows are data flows in a PDU session that have a same QoS requirement, and may be a plurality of IP flows having a same QoS requirement.

(8). A data radio bearer (DRB) may be understood as a data bearer between a base station and a terminal. Data packets in the data bearer have same forwarding processing.

(9). A DN is an external data network.

(10). A reflective QoS characteristic means that a QoS flow is symmetrical in terms of uplink and downlink. To be specific, uplink QoS is the same as downlink QoS, and an uplink packet filtering template and a downlink packet filtering template are also symmetrical. For example, an uplink source address is a downlink destination address, an uplink source port number is a downlink destination port number, an uplink destination address is a downlink source address, and an uplink destination port number is a downlink source port number. A terminal obtains a packet filter of an uplink packet and a QoS flow ID of the uplink packet based on the reflective characteristic by using header information of a downlink data packet.

The embodiments of this application provide a reflective QoS characteristic-based communications method, and the method is applicable to a system with a QoS flow-based QoS architecture. For example, the method is applicable to a scenario in which a terminal accesses a fifth-generation core network (5G Core, 5GC) by using a next generation NodeB (gNB), including a scenario in which the terminal accesses the network by using a single link, or accesses the network by using a plurality of links. For example, in a multi-connection scenario, the terminal accesses a 5G network by using a master gNB (MgNB) and a secondary gNB (SgNB).

In the embodiments of this application, a 5G network scenario in a wireless communications network is used as an example below for description. It should be pointed out that the solutions in the embodiments of this application may be further applied to another wireless communications network, and a corresponding name may also be replaced with a name of a corresponding function in the another wireless communications network.

FIG. 1 is a schematic structural diagram of a communications system to which this application is applicable. The communications system shown in FIG. 1 includes a next generation core network (NGC), also referred to as 5GC) and a next generation radio access network (NG-RAN). The 5GC mainly includes a user plane network element (UPF) and an access and mobility management function (AMF) of a control plane network element. The AMF is mainly responsible for access and mobility management for a terminal. The UPF is mainly responsible for IP address allocation and PDU session control and management for the terminal, and further includes functions such as data packet routing and forwarding and QoS management. A main network element included in the NG-RAN is a next generation NodeB (gNB). The gNB provides a new radio (NR) control plane and a user plane protocol stack that are terminated at the terminal. For example, the gNB is responsible for functions such as access control, link management, measurement, dynamic resource allocation, and bearer management that are for the terminal, and is responsible for intra-cell and inter-cell radio resource management (RRM) functions. Further, an interface between control planes of the 5GC and the NG-RAN is an N2 interface, an interface between user planes of the 5GC and the NG-RAN is an N3 interface, and an interface between gNBs is an Xn interface.

Figure 2:
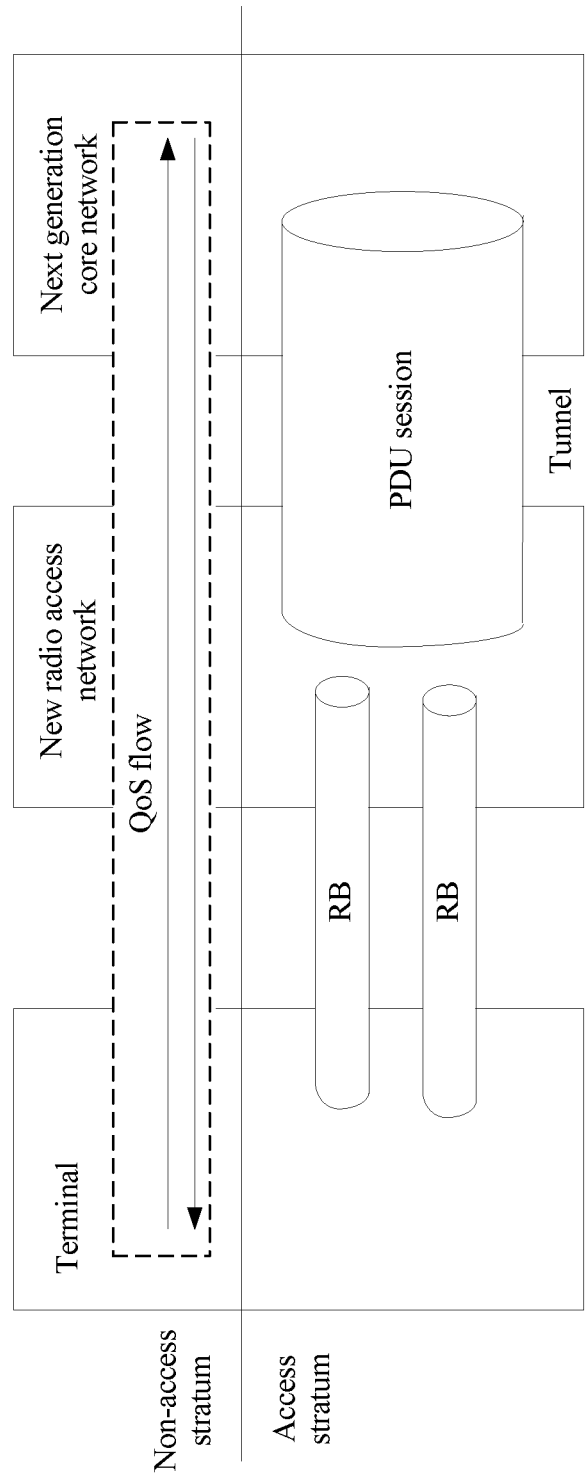
FIG. 2 is a diagram of a QoS flow-based QoS architecture.

A QoS flow-based QoS architecture in a 5G scenario is shown in FIG. 2. A non-access stratum service bearer corresponds to a QoS flow, and an access stratum service bearer corresponds to an air-interface radio bearer (RB) and a terrestrial tunnel (between the RAN and the 5GC). The tunnel is established based on a PDU session. To be specific, QoS flows belonging to a same PDU session use a same tunnel. Each PDU session has a unique identifier, and the unique identifier of the PDU session may be one of the following: a PDU session identifier, an access point name (APN), an identifier of a user-plane core network device, an address (for example, an IP address) of the user-plane core network device, and an IP address allocated by the user-plane core network device to user equipment.

Figure 3:
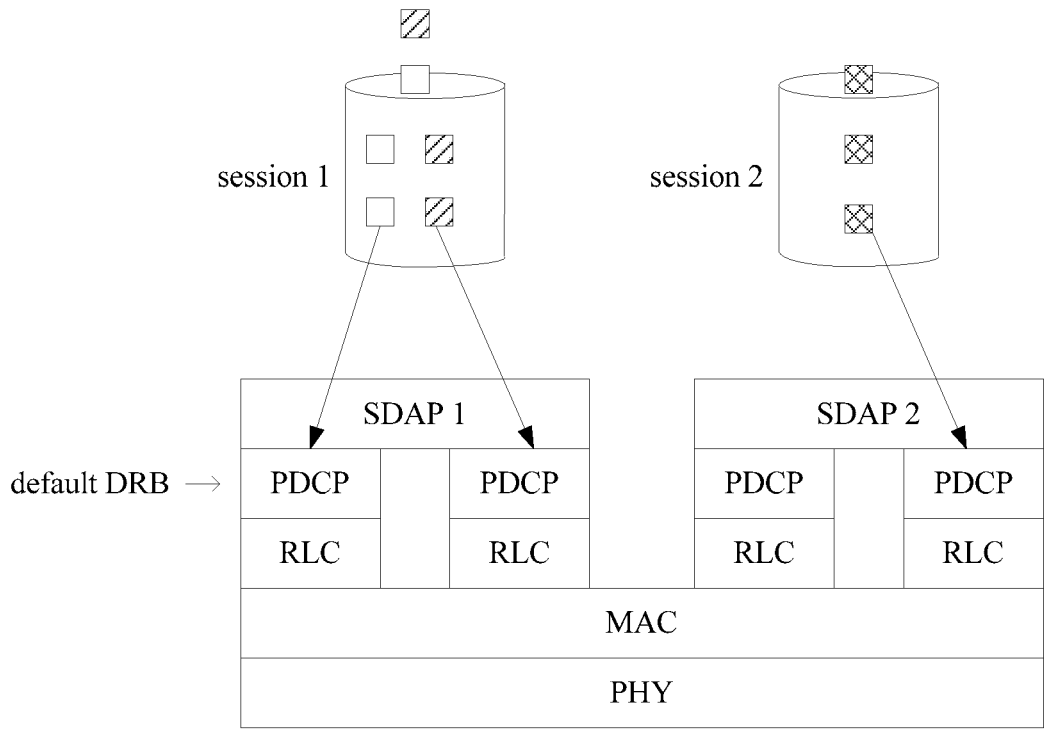
FIG. 3 is a schematic diagram of a process of mapping a QoS flow to a DRB.

The QoS flow-based QoS architecture mainly includes QoS flow mapping in an access stratum and a non-access stratum. The access stratum is responsible for mapping a QoS flow to a DRB, and the non-access stratum is responsible for mapping an IP flow to a QoS flow. Further, mapping another type of data packets to a QoS flow is further included. For a process of mapping a QoS flow to a DRB, refer to FIG. 3. In a protocol stack on a radio access network side linked to the NGC, a Service Data Adaption Protocol (SDAP) layer is used above a Packet Data Convergence Protocol (PDCP) layer on a user plane, and the SDAP protocol layer is responsible for mapping a QoS flow from the non-access stratum to a DRB in the access stratum. An SDAP entity that executes the SDAP protocol is established based on a session, and is further responsible for adding an uplink QoS flow ID and a downlink QoS flow ID to an air-interface protocol stack. In the process of mapping a QoS flow to a DRB, a plurality of QoS flows in a same session may be mapped to a same DRB. Same forwarding processing may be performed on data packets in a same DRB based on a QoS profile (the QoS profile is a QoS parameter corresponding to a QoS flow ID, and includes one or more of a delay, a packet loss rate, a priority, a guaranteed rate, a maximum rate, and an unsatisfied rate notification indication) corresponding to a QoS flow ID in a header of a data packet on the user plane. QoS flows in different sessions cannot be mapped to a same DRB. Further, each session of each terminal corresponds to a default DRB. The terminal maps, to the default DRB, a QoS flow for which a mapping relationship between an uplink QoS flow and a DRB is not configured. Further, the gNB on the radio access network side may configure, for the terminal, the mapping relationship between an uplink QoS flow and a DRB by using radio resource control (RRC) signaling or through reflective mapping (reflective mapping means that a downlink data packet includes a QoS flow ID, and the terminal detects the QoS flow ID and maps uplink QoS flows with the same QoS flow ID to a same DRB).

Figure 4:
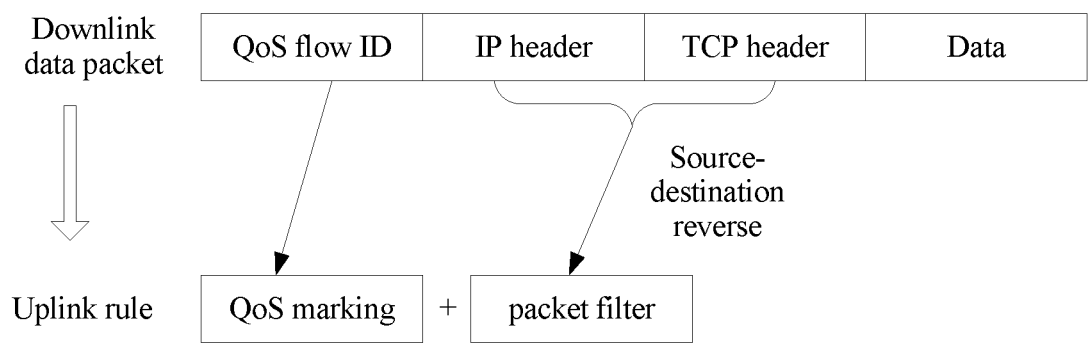
FIG. 4 is a schematic diagram of a process of obtaining an uplink QoS flow ID and an uplink packet filter.
Figure 5:
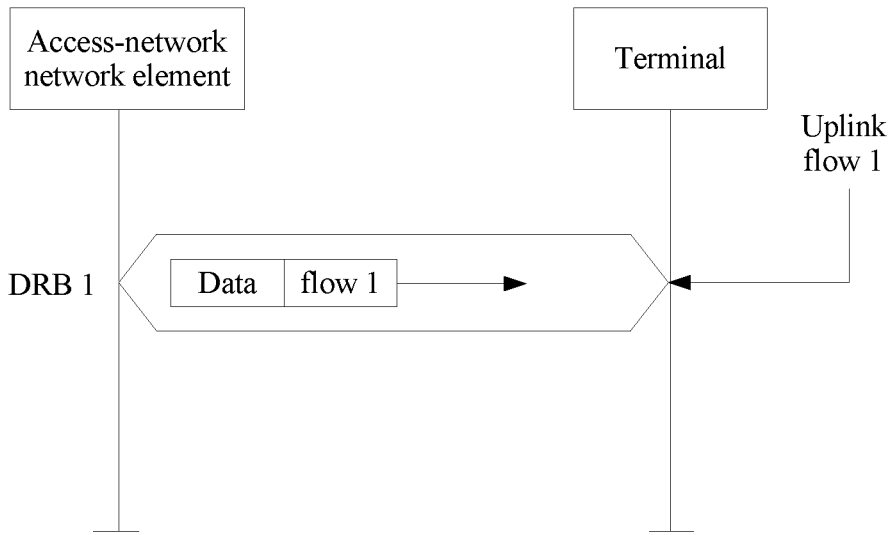
FIG. 5 is a schematic diagram of a process of mapping an uplink flow to a DRB.

A reflective QoS characteristic may be used for mapping in a process of mapping an IP flow or another type of data packets to a QoS flow. The core network may activate the reflective QoS characteristic by using a control plane or the user plane. Specifically, the core network may notify, by using a non-access stratum message, the terminal that a reflective QoS characteristic of a QoS flow is activated. For example, indication information indicating that the reflective QoS characteristic of the QoS flow is activated is included in a rule of the QoS flow, or a reflective QoS indicator (RQI) is included in a header of a data packet to be sent from the core network to the radio access network side to indicate that the data packet has the reflective QoS characteristic. For example, in FIG. 4, a downlink data packet includes a QoS flow ID, an IP header, a Transmission Control Protocol (TCP) header, and data content. In this case, an uplink QoS rule is to reverse sources and destinations of the IP header and the TCP header. To be specific, an uplink source address is a downlink destination address, an uplink source port number is a downlink destination port number, an uplink destination address is a downlink source address, and an uplink destination port number is a downlink source port number. The terminal obtains a packet filter of an uplink packet and a QoS flow ID of the uplink packet based on the reflective characteristic by using header information of the downlink data packet, and performs QoS marking by using the QoS flow ID. The terminal implicitly configures mapping from an uplink QoS flow to a DRB. To be specific, the terminal maps an uplink QoS flow to a DRB in which a downlink QoS flow having a same QoS flow ID as the uplink QoS flow is located. As shown in FIG. 5, an uplink flow 1 is mapped to a DRB 1 in which a downlink flow 1 is located. The radio access network side may reduce RRC configuration signaling used for configuring mapping of an uplink flow to a radio bearer. However, for each received downlink data packet, the terminal needs to determine whether the each received downlink data packet has the reflective QoS characteristic. In a 5G communications system, a data transmission rate is extremely high, and if the terminal detects each downlink data packet, extremely large overheads are caused, affecting performance and power consumption of the terminal.

In view of this, an embodiment of this application provides a reflective QoS characteristic-based communications method. In the method, an access-network network element determines whether there is a need to send a QoS flow identifier to a terminal. The access-network network element sends a QoS flow identifier to the terminal when determining that there is a need to send the QoS flow identifier to the terminal, or the access-network network element does not send a QoS flow identifier to the terminal when there is no need to send the QoS flow identifier to the terminal, so as to save signaling overheads. Further, the access-network network element may filter a to-be-sent QoS flow identifier. A QoS flow identifier is included in a header of a data packet to be sent to the terminal, when determining that there is a need to add the QoS flow identifier to the header of the data packet; or a QoS flow identifier is not included in a header of a data packet to be sent to the terminal, when there is no need to add the QoS flow identifier to the header of the data packet, so as to save signaling overheads.

Figure 6:
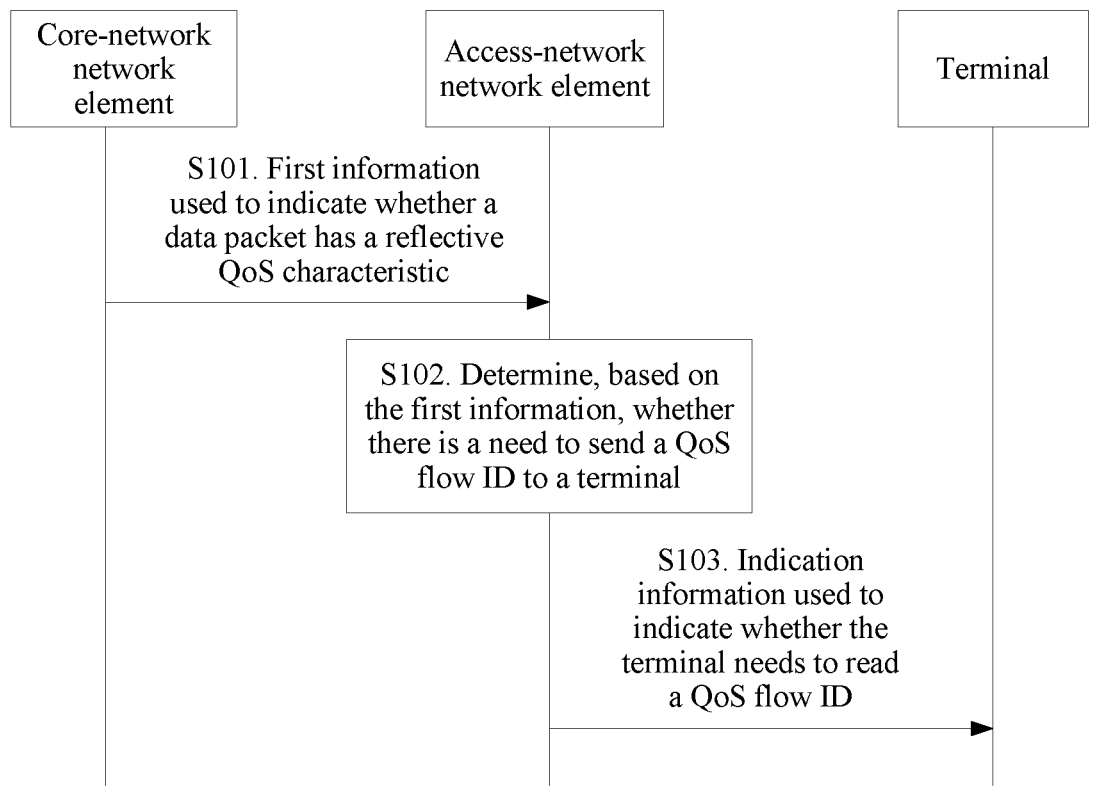
FIG. 6 shows a reflective QoS characteristic-based communications method according to an embodiment of this application.

FIG. 6 shows a reflective QoS characteristic-based communications method according to an embodiment of this application. Referring to FIG. 6, the method includes the following steps.

S101. A core-network network element sends first information to an access-network network element, and the access-network network element receives the first information sent by the core-network network element, where the first information is used to indicate whether a data packet has a reflective QoS characteristic.

In this application, the core-network network element may be a core network control plane network element, such as an AMF. The access-network network element may be a base station, such as a gNB.

When the core-network network element is a core network control plane network element, the core-network network element may send, to the access-network network element by using an N2 interface message, the first information used to indicate whether a data packet has the reflective QoS characteristic. The N2 interface message includes but is not limited to a PDU session setup message (PDU Session Resource Setup), a PDU session modification message (PDU Session Resource Modify), or the like.

The first information is used to indicate whether a data packet has the reflective QoS characteristic. If a data packet has the reflective QoS characteristic, this means that the terminal can obtain an uplink QoS flow ID and an uplink packet filter based on the data packet in a reflective manner. The packet filter is used to filter an uplink data packet to obtain an uplink QoS flow. If a data packet does not have the reflective QoS characteristic, this means that the terminal cannot obtain an uplink QoS flow ID and an uplink packet filter based on the data packet in a reflective manner.

S102. The access-network network element determines, based on the first information, whether there is a need to send a QoS flow ID to a terminal.

S103. The access-network network element sends first indication information to the terminal, where the first indication information is used to indicate whether the terminal needs to read a QoS flow ID.

The terminal receives the first indication information, and determines, based on the first indication information, whether there is a need to read a QoS flow ID.

In this embodiment of this application, if the first information indicates that a data packet has the reflective QoS characteristic, the access-network network element determines that there is a need to send a QoS flow ID to the terminal. Optionally, in this case, the access-network network element notifies the terminal that there is a need to read a QoS flow ID. Alternatively, if the first information indicates that a data packet does not have the reflective QoS characteristic, the access-network network element may determine that there is no need to send a QoS flow ID to the terminal. In this case, the access-network network element may notify the terminal that there is no need to read a QoS flow ID, so as to save signaling overheads.

In a possible implementation, the first information is further used to indicate a reflective QoS type of a data packet. The reflective QoS type of a data packet includes: all data packets have the reflective QoS characteristic, some data packets have the reflective QoS characteristic, or none of data packets have the reflective QoS characteristic.

The access-network network element may determine, based on the first information, whether a data packet has the reflective QoS characteristic, and determine, based on the reflective QoS type of a data packet, whether all data packets have the reflective QoS characteristic, some data packets have the QoS reflective QoS characteristic, or none of data packets have the reflective QoS characteristic. The access-network network element may also determine, based on the reflective QoS type of a data packet, whether a data packet has the reflective QoS characteristic.

In this embodiment of this application, the reflective QoS type of a data packet may be indicated in the following manner. For example, the core-network network element may notify, in a manner in which the core-network network element notifies the terminal of the reflective QoS characteristic by using a control plane message in a non-access stratum, the terminal that all data packets have the reflective QoS characteristic; or notify, in a manner of adding an indication to a user-plane packet header, the terminal that some data packets have the reflective QoS characteristic. The core-network network element notifies, in a manner in which the core-network network element does not notify the terminal of the reflective QoS characteristic or the core-network network element notifies the terminal that a QoS flow or a PDU session does not have the reflective QoS characteristic, the terminal that none of data packets have the reflective QoS characteristic.

In this embodiment of this application, the core-network network element may instruct the access-network network element to notify the terminal of the reflective QoS characteristic, so as to notify the terminal whether a data packet has the reflective QoS characteristic and notify the terminal of a reflective QoS type of the data packet.

With reference to actual application, the embodiments of this application describe below an implementation process in which the access-network network element in this embodiment of this application determines whether there is a need to send a QoS flow ID to the terminal.

In a possible implementation of this application, the first information may be reflective QoS information sent by a core network control plane network element, and the reflective QoS information is used to indicate whether a data packet has the reflective QoS characteristic. The first indication information is reflective QoS information sent by the access-network network element to the terminal.

Figure 7:
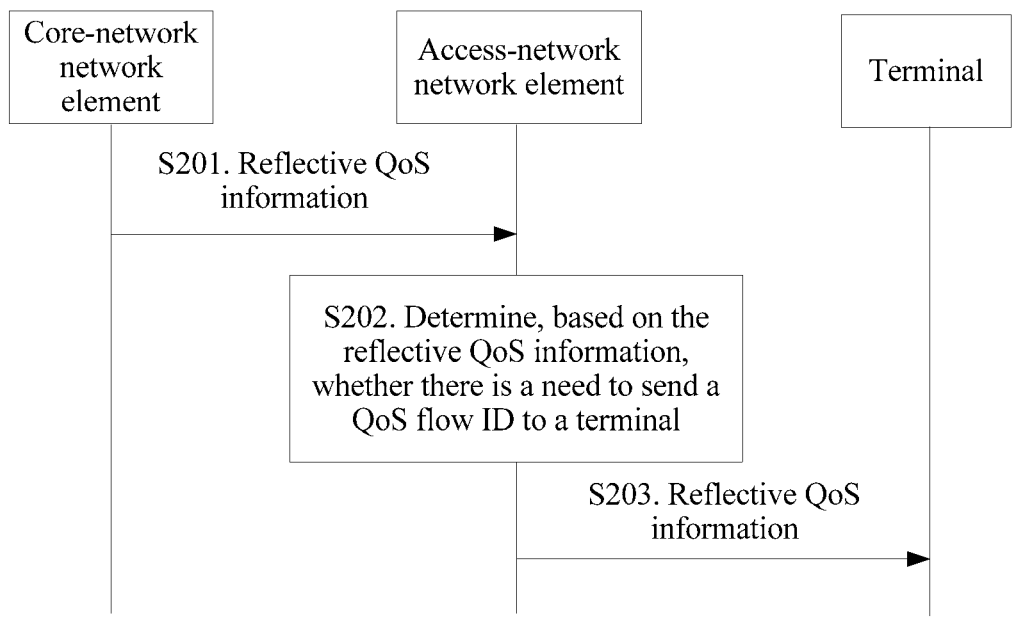
FIG. 7 is a flowchart of an implementation method of a reflective QoS characteristic-based communications method according to an embodiment of this application.

FIG. 7 is a flowchart of an implementation method of a reflective QoS characteristic-based communications method according to an embodiment of this application. Referring to FIG. 7, the method includes the following steps.

S201. A core network control plane network element sends reflective QoS information to an access-network network element, where the reflective QoS information is used to indicate whether a data packet has a reflective QoS characteristic.

Further, the reflective QoS information may be information used to indicate a reflective QoS type of a data packet.

In this embodiment of this application, the reflective QoS information may be reflective QoS information of a QoS flow, or may be reflective QoS information of a PDU session. In other words, the core network control plane network element may indicate reflective QoS information of a QoS flow or reflective QoS information of a PDU session by using an N2 interface message.

For the reflective QoS information, the reflective QoS information of a QoS flow or reflective QoS information of a PDU session may be indicated by using a PDU Session Resource Setup message, or the reflective QoS information of a QoS flow or the reflective QoS information of a PDU session may be indicated by using a PDU Session Resource Modify message.

A protocol format in which the reflective QoS information of a QoS flow is indicated by using the PDU Session Resource Setup message may be shown in Table 1. A protocol format in which the reflective QoS information of a PDU session is indicated by using the PDU Session Resource Setup message may be shown in Table 2.

TABLE 1

| | | |
|---|---|---|
| >>QoS Flows To Be Setup List | | 1 |
| >>>QoS Flows To Be Setup Item IEs | | 1 . . . <maxnoof QoSFlows> |
| >>>>QoS Flow Indicator | M | |
| >>>>QoS Flow Level QoS Parameters | FFS | |
| >>>>Whether the QoS flow has the reflective QoS characteristic | Enumerate {yes, no} | |
| Reflective QoS characteristic | Enumerate {all data packets have the reflective QoS characteristic, some data packets have the reflective QoS characteristic}, if the QoS flow has the reflective QoS characteristic. | |

TABLE 2

| | | |
|---|---|---|
| >>PDU Session ID (FFS) | M | |
| >>>>Whether the PDU session has the reflective QoS characteristic | Enumerate {yes, no}, and herein this is for all QoS flows in the PDU session. | |
| Reflective QoS characteristic | Enumerate {all data packets have the reflective QoS characteristic, some data packets have the reflective QoS characteristic}, if the PDU session has the reflective QoS characteristic. | |

A protocol format in which the reflective QoS information of a QoS flow is indicated by using the PDU Session Resource Modify message may be shown in Table 3. A protocol format in which the reflective QoS information of a PDU session is indicated by using the PDU Session Resource Setup message may be shown in Table 4.

TABLE 3

| | | |
|---|---|---|
| >>QoS Flows To Add Or Modify List | | 0 . . . 1 |
| >>>QoS Flows To Add Or Modify Item IEs | | 1 . . . <maxnoof QoSFlows> |
| >>>>QoS Flow Indicator | M | |
| >>>>QoS Flow Level QoS Parameters | O | |
| >>>>Whether the QoS flow has the reflective QoS characteristic | Enumerate {yes, no} | |
| Reflective QoS characteristic | Enumerate {all data packets have the reflective QoS characteristic, some data packets have the reflective QoS characteristic}, if the QoS flow has the reflective QoS characteristic. | |

TABLE 4

| | | |
|---|---|---|
| >>PDU Session ID (FFS) | M | |
| >>>>Whether the PDU session has the reflective QoS characteristic | Enumerate {yes, no}, and herein this is for all QoS flows in the PDU session. | |
| Reflective QoS characteristic | Enumerate {all data packets have the reflective QoS characteristic, some data packets have the reflective QoS characteristic}, if the PDU session has the reflective QoS characteristic. | |

In a possible implementation of this embodiment of this application, the core network control plane network element may further send reflective QoS information update indication information to the access-network network element, and the reflective QoS information update indication information is used to instruct the access-network network element to update the received reflective QoS information.

The core network control plane network element (such as an AMF) may send the reflective QoS information update indication information to the access-network network element (such as a base station) by using the N2 interface message. The used N2 interface message includes but is not limited to the PDU Session Resource Modify message.

In this application, the reflective QoS information that the reflective QoS information update indication information instructs the access-network network element to update is the same as the foregoing reflective QoS information. For details, refer to related descriptions of the reflective QoS information in the foregoing embodiment. Details are not described herein again.

S202. The access-network network element receives the reflective QoS information sent by the core network control plane network element, and determines, based on the reflective QoS information sent by the core network control plane network element, whether there is a need to send a QoS flow ID to a terminal.

When determining that a data packet has the reflective QoS characteristic, the access-network network element determines that there is a need to send a QoS flow ID to the terminal; or when determining that a data packet does not have the reflective QoS characteristic, the access-network network element determines that there is no need to send a QoS flow ID to the terminal, so as to save signaling overheads.

The access-network network element may determine, based on the reflective QoS information of a QoS flow or a PDU session, whether to add a QoS flow ID to a header of a data packet to be sent through an air interface. For example, for a data packet that has the reflective QoS characteristic, a QoS flow ID is included in a header of the data packet to be sent through the air interface. For a data packet that does not have the reflective QoS characteristic, a QoS flow ID is not included in a header of the data packet to be sent through the air interface, so as to save signaling overheads.

Further, the access-network network element may determine a mapping relationship between a QoS flow and a DRB based on the reflective QoS information of a QoS flow or a PDU session, for example, the access-network network element may map QoS flows that vary in the reflective QoS characteristic to different DRBs.

In another possible implementation, the access-network network element in this embodiment of this application may send the reflective QoS information to the terminal after receiving the reflective QoS information sent by the core network control plane network element, so that the terminal determines whether a data packet has reflective QoS information, so as to determine whether there is a need to detect a QoS flow ID. For example, the method shown in FIG. 7 further includes the following step:

S203. The access-network network element sends the reflective QoS information to the terminal.

In this embodiment of this application, the access-network network element (such as a base station) sends the reflective QoS information to the terminal by using RRC signaling or a user plane control PDU.

In this embodiment of this application, the reflective QoS information sent by the access-network network element to the terminal is similar to the foregoing reflective QoS information sent by the core-network network element to the terminal, and a difference lies in that the reflective QoS information sent by the access-network network element to the terminal may be reflective QoS information of a QoS flow, reflective QoS information of a DRB, or reflective QoS information of a PDU session (or an SDAP entity). In other words, the access-network network element may notify the terminal of reflective QoS information of a QoS flow, reflective QoS information of a DRB, or reflective QoS information of a PDU session (or an SDAP entity).

A protocol format of the reflective QoS information of a QoS flow may be shown in FIG. 5.

TABLE 5

| >QoS flow list | 1 |
|---|---|
| >>QoS flow ID | {1 . . . maxnumber} |
| >>>>Whether the QoS flow has the reflective QoS characteristic | Enumerate {yes, no} |
| Reflective QoS characteristic | Enumerate {all data packets have the reflective QoS characteristic, some data packets have the reflective QoS characteristic}, if the QoS flow has the reflective QoS characteristic. |

A protocol format of the reflective QoS information of a DRB may be shown in FIG. 6.

TABLE 6

| >DRB list | 1 |
|---|---|
| >>DRB ID | {1 . . . maxnumber} |
| >>>>Whether the DRB has the reflective QoS characteristic | Enumerate {yes, no} |
| Reflective QoS characteristic | Enumerate {all data packets have the reflective QoS characteristic, some data packets have the reflective QoS characteristic}, if the DRB has the reflective QoS characteristic. |

A protocol format of the reflective QoS information of a PDU session or an SDAP entity may be shown in FIG. 7.

TABLE 7

| >>PDU Session/SDAP entity list | 1 |
|---|---|
| >>PDU Session ID/SDAP entity id | {1 . . . maxnumber} |
| >>>>Whether the PDU session or the SDAP entity has the reflective QoS characteristic | Enumerate {yes, no} |
| Reflective QoS characteristic | Enumerate {all data packets have the reflective QoS characteristic, some data packets have the reflective QoS characteristic}, if the PDU session or the SDAP entity has the reflective QoS characteristic. |

The terminal receives the reflective QoS information sent by the access-network network element, and determines, based on the reflective QoS information, whether there is a need to read a QoS flow ID.

Further, the access-network network element may indicate a reflective QoS characteristic of a data packet by sending, to the terminal, indication information indicating whether the terminal needs to read a QoS flow ID. For example, the access-network network element sends, to the terminal, indication information indicating whether the terminal needs to read a QoS flow ID from a DRB or SDAP, so as to indicate the reflective QoS characteristic of a data packet.

Further, the access-network network element may send reflective QoS information update indication information to the terminal by using RRC signaling or a user plane control PDU. Reflective QoS information that the reflective QoS information update indication information sent by the access-network network element to the terminal instructs the terminal to update is the same as the reflective QoS information sent by the access-network network element to the terminal, and details are not described herein.

After receiving the reflective QoS information sent by the access-network network element, the terminal determines, based on the reflective QoS information, a data packet having the reflective QoS characteristic. The terminal detects a QoS flow ID and a data packet header for a DRB, an SDAP entity, or a QoS flow that includes a data packet having the reflective QoS characteristic, and generates an uplink QoS flow ID and a corresponding packet filter based on the detected QoS flow ID. However, the terminal may not detect a QoS flow ID and a data packet header for a DRB, an SDAP entity, or a QoS flow of a data packet that does not have the reflective QoS characteristic, so as to save signaling overheads of the terminal.

In another possible embodiment of this application, for a QoS flow whose QoS parameter is standardized, the core-network network element does not notify the access-network network element of the QoS parameter of the QoS flow by using the N2 interface message, but adds a QoS flow ID to a header of a data packet to be sent through an N3 interface. The QoS flow ID corresponds to a set of standardized QoS parameters. In this scenario, the core-network network element may not send a reflective QoS characteristic of the QoS flow to the access-network network element. The access-network network element may consider by default that the QoS flow has the reflective QoS characteristic, and that some data packets have the reflective QoS characteristic. Alternatively, after the access-network network element obtains an RQI by parsing a header of a data packet to be sent through an N3 interface, the access-network network element determines that the QoS flow has the reflective QoS characteristic and that some data packets have the reflective QoS characteristic. The RQI is used to indicate that a data packet has the reflective QoS characteristic.

In still another possible embodiment of this application, the core-network network element may send reflective QoS information deactivation indication information to the access-network network element. The reflective QoS information deactivation indication information is used to indicate reflective QoS deactivation information. The reflective QoS deactivation information means that a data packet having the reflective QoS characteristic as indicated by the reflective QoS information does not have the reflective QoS characteristic any longer.

Figure 8:
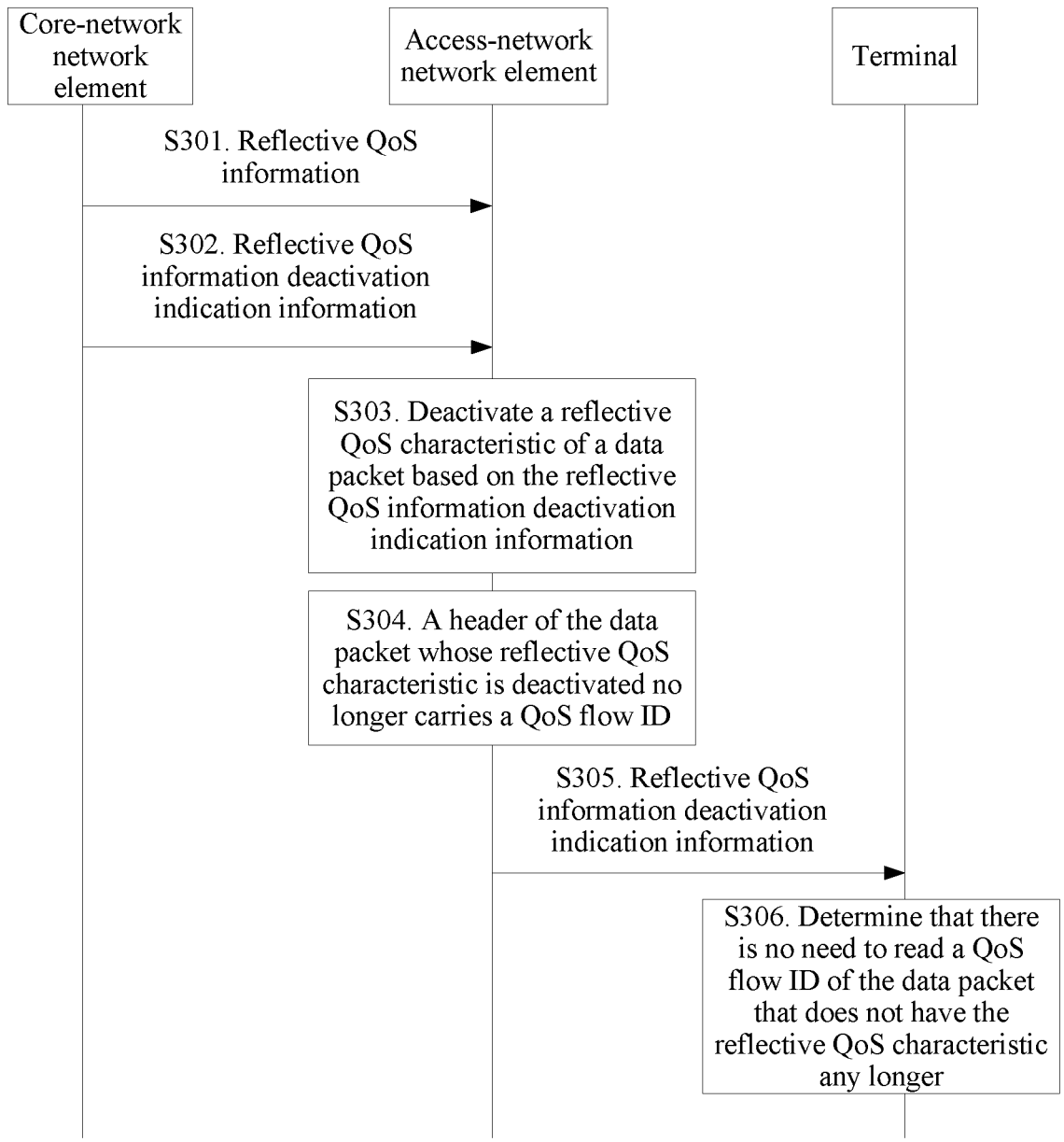
FIG. 8 is a flowchart of another implementation method of a reflective QoS characteristic-based communications method according to an embodiment of this application.

FIG. 8 is a flowchart of another implementation method of a reflective QoS characteristic-based communications method according to an embodiment of this application. Referring to FIG. 8, the method includes the following steps.

An execution step of S301 is the same as an execution step of S201, and details are not described herein again.

S302. The core-network network element sends reflective QoS information deactivation indication information to the access-network network element.

In this embodiment of this application, the reflective QoS information deactivation indication information is used to notify the access-network network element device of reflective QoS deactivation information, and the reflective QoS deactivation information means that a data packet having the reflective QoS characteristic as indicated by the reflective QoS information does not have the reflective QoS characteristic any longer. Specifically, the reflective QoS deactivation information may be used to deactivate the reflective QoS characteristic for all data packets or deactivate the reflective QoS characteristic for some data packets.

In this embodiment of this application, the reflective QoS deactivation information that the reflective QoS information deactivation indication information indicates may be reflective QoS deactivation information of a QoS flow, or may be reflective QoS deactivation information of a PDU session. It may be understood that, the core-network network element notifies the access-network network element that a data packet of a QoS flow does not have the reflective QoS characteristic any longer, or data packets of all QoS flows in a PDU session do not have the reflective QoS characteristic any longer. It may also be understood that the reflective QoS information deactivation indication information may be used to indicate deactivation of the reflective QoS characteristic for a data packet of a QoS flow or for a PDU session whose {all packets have the reflective QoS characteristic} or whose {some packets have the reflective QoS characteristic}.

The reflective QoS information deactivation indication information may be used to indicate deactivation of the reflective QoS characteristic for one or more QoS flows or PDU sessions. When the reflective QoS information deactivation indication information indicates deactivation of the reflective QoS characteristic for a QoS flow, an identifier of the QoS flow, such as a QoS flow ID, is added to the reflective QoS deactivation information. When the reflective QoS information deactivation indication information indicates deactivation of the reflective QoS characteristic for a PDU session, an identifier of the PDU session, such as a PDU session ID, is added to the reflective QoS deactivation information.

In a possible implementation of this application, a core network control plane network element (such as an AMF) may send the reflective QoS deactivation information to the access-network network element (such as a base station) by using an N2 interface message. The N2 interface message includes but is not limited to a PDU Session Resource Modify message, and may further use another standalone message.

In another possible implementation of this application, a core network user plane network element (such as a UPF) may send the reflective QoS information deactivation indication information to the access-network network element (such as a base station) by sending a data packet through an N3 interface.

The reflective QoS information deactivation indication information may be added to a header of the data packet at the N3 interface, so as to indicate deactivation of the reflective QoS characteristic for the data packet.

Further, the reflective QoS information deactivation indication information carried in the header of the data packet at the N3 interface may be added based on a QoS flow, or may be added based on a PDU session. A plurality of pieces of indication information may be set for a same QoS flow or a same PDU session to enhance robustness.

S303. The access-network network element receives the reflective QoS information deactivation indication information, and deactivates the reflective QoS characteristic for a data packet based on the reflective QoS information deactivation indication information.

In a possible implementation, an example in which the core-network network element sends the reflective QoS information deactivation indication information to the access-network network element (such as a base station) by sending a data packet through the N3 interface is used for description. If a header of a data packet at the N3 interface received by the access-network network element carries a QoS flow ID and the reflective QoS information deactivation indication information, the reflective QoS characteristic is deactivated for the QoS flow. If a header of a data packet at the N3 interface received by the access-network network element does not carry a QoS flow ID but carries only the reflective QoS information deactivation indication information, it indicates that the reflective QoS characteristic is deactivated for the PDU session. If a header of a data packet at the N3 interface received by the access-network network element carries a PDU session ID and the reflective QoS information deactivation indication information, it indicates that a PDU session corresponding to the PDU session ID is to be deactivated. In this case, the reflective QoS characteristic is deactivated for the PDU session corresponding to the PDU session ID.

S304. The access-network network element determines that there is no need to send a QoS flow ID for a data packet whose reflective QoS characteristic has been deactivated.

For example, for a QoS flow whose reflective QoS characteristic has been deactivated, the access-network network element no longer adds a QoS flow ID to a header of a data packet that is of the QoS flow and that is to be sent through an air interface.

In a possible implementation, after obtaining the reflective QoS information, the access-network network element in this embodiment of this application may further send the reflective QoS information deactivation indication information to a terminal. The step of sending, by the access-network network element, the reflective QoS information deactivation indication information to a terminal may be performed based on the method shown in FIG. 7, or may be performed based on the method shown in FIG. 8. An example in which the step is performed based on the method shown in FIG. 8 is used for description below in this embodiment of this application. Based on the method in FIG. 8, the method may further include the following step:

S305. The access-network network element sends the reflective QoS information deactivation indication information to a terminal.

In this embodiment of this application, reflective QoS deactivation information that the reflective QoS information deactivation indication information sent by the access-network network element to the terminal indicates is similar to the foregoing reflective QoS deactivation information that the reflective QoS information deactivation indication information sent by the core-network network element to the access-network network element indicates. A difference lies in that the reflective QoS deactivation information that the reflective QoS information deactivation indication information sent by the access-network network element to the terminal indicates may be not only reflective QoS deactivation information of a QoS flow or a PDU session, but also reflective QoS deactivation information of a DRB.

In this embodiment of this application, the access-network network element may deactivate reflective QoS information by using RRC signaling or a user plane control PDU, so as to indicate that a data packet does not have the reflective QoS characteristic any longer.

For example, the access-network network element may send the reflective QoS information deactivation indication information to the terminal by using RRC signaling (such as an RRC configuration message or an RRC reconfiguration message) or a user plane control PDU (an SDAP control PDU or a PDCP control PDU), and adds a QoS flow ID to the reflective QoS information deactivation indication information, so as to indicate that a data packet of a QoS flow does not have the reflective QoS characteristic any longer.

For another example, the access-network network element may send the reflective QoS information deactivation indication information to the terminal by using RRC signaling (such as an RRC configuration message or an RRC reconfiguration message) or a user plane control PDU (an SDAP control PDU or a PDCP control PDU), and adds a DRB ID to the reflective QoS information deactivation indication information, so as to indicate that a data packet of a corresponding DRB does not have the reflective QoS characteristic any longer.

For still another example, the access-network network element may send the reflective QoS information deactivation indication information to the terminal by using RRC signaling (such as an RRC configuration message or an RRC reconfiguration message) or a user plane control PDU (an SDAP control PDU or a PDCP control PDU), and adds a PDU session ID or an SDAP entity ID to the reflective QoS information deactivation indication information, so as to indicate that a data packet of a PDU session does not have the reflective QoS characteristic any longer.

In another embodiment of this application, the access-network network element may send the reflective QoS information deactivation indication information to the terminal by using user plane data. For example, the access-network network element adds the reflective QoS information deactivation indication information to a header of a data packet to be sent through an air interface, so as to indicate deactivation of the reflective QoS characteristic. For example, 1 bit is used to represent the reflective QoS information deactivation indication information, and a bit setting manner is used to indicate deactivation of the reflective QoS characteristic. The reflective QoS information deactivation indication information carried in the header of the air-interface data packet may be used to deactivate the reflective QoS characteristic for a data packet of a QoS flow, a DRB, or a PDU session whose {all packets have the reflective QoS characteristic} or whose {some packets have the reflective QoS characteristic}.

Further, the access-network network element each time may indicate reflective QoS deactivation information of one QoS flow.

Further, a plurality of pieces of reflective QoS information deactivation indication information may be set for a same QoS flow to enhance robustness. Alternatively, the reflective QoS information deactivation indication information is continuously sent, and if a base station obtains an acknowledgment indicating that the terminal has received a data packet, sending of the reflective QoS information deactivation indication information is stopped.

In a possible implementation, the access-network network element adds a QoS flow ID and the reflective QoS information deactivation indication information to a header of a data packet to be sent through an air interface, so as to indicate that the reflective QoS characteristic has been deactivated for a QoS flow. Alternatively, the access-network network element adds only the reflective QoS information deactivation indication information to a header of a data packet to be sent through an air interface, so as to indicate that the reflective QoS characteristic has been deactivated for a PDU session, or adds only indication information to a header of a data packet to be sent through an air interface, so as to indicate that a range of the reflective QoS information deactivation indication information is a PDU session. For example, a PDU session ID or an SDAP entity ID corresponding to a PDU session is carried.

In another possible implementation, the access-network network element may use a manner of instructing the terminal not to read a QoS flow ID any longer, so as to indicate that the reflective QoS characteristic has been deactivated for a data packet.

S306. The terminal receives the reflective QoS information deactivation indication information sent by the access-network network element, and determines that there is no need to read a QoS flow ID of the data packet that does not have the reflective QoS characteristic any longer.

For example, for a DRB that does not have the reflective QoS characteristic any longer or a DRB of an SDAP entity or a PDU session that does not have the reflective QoS characteristic any longer, the terminal does not read a QoS flow ID from a received PDCP SDU. In other words, the terminal does not detect a QoS flow ID for each received data packet, so as to save signaling overheads.

In this embodiment of this application, the following operations may be performed for a data packet that does not have the reflective QoS characteristic, so as to save signaling overheads.

For example, for a received PDCP SDU, the terminal no longer obtains an IP quintuple (or another byte in a protocol data packet header, such as a MAC source address and a MAC destination address) of the data packet, so as to save signaling overheads.

For another example, the terminal no longer reads and identifies an SDAP header of each data packet, so as to save signaling overheads.

Further, a decompression operation performed at a PDCP layer at a receive end of the terminal for robust header compression (ROHC) may be used to directly decompress a PDCP service data unit (SDU) from which a PDCP header is removed, and there is no need to perform an operation caused by an SDAP header such as an initial decompression location offset operation. To be specific, the following operations do not need to be performed, so as to save signaling overheads: Existence of the SDAP header is first detected, then decompression starts to be performed after the SDAP header is removed from the PDCP SDU, the SDAP header is re-added to content obtained after decompression, and so on.

Further, if the SDAP header is placed at a tail of a data packet, when ROCH header compression is performed for a received PDCP SDU at a PDCP layer at a transmit end, an initial header compression location offset operation is not performed. An initial header decompression location offset operation is also not performed when decompression is performed at the PDCP layer at the receive end, so as to save signaling overheads.

Further, if a PDCP layer entity at the receive end fails to perform header decompression, the data packet continues to be delivered to an SDAP layer. An SDAP layer entity may read the SDAP header from the tail or a head of the data packet to obtain a QoS flow ID, and may obtain a mapping relationship between an uplink QoS flow and a DRB based on a reflective mapping rule. Then the SDAP layer entity discards the data packet.

Further, after the PDCP entity at the receive end fails to perform the header decompression operation, if the PDCP SDU carries the SDAP header or a QoS flow ID, the PDCP entity at the receive end delivers the PDCP SDU to the SDAP layer and indicates that the header decompression fails. In this case, the SDAP layer may read the SDAP header from the tail or a head of the data packet to obtain the QoS flow ID, and may obtain a mapping relationship between an uplink QoS flow and a DRB based on a reflective mapping rule. Then the SDAP layer entity discards the data packet.

Further, in another possible implementation, after the header decompression operation performed at the PDCP layer at the receive end fails, if the PDCP SDU carries the SDAP header or a QoS flow ID, the PDCP layer at the receive end sends a PDCP status report to the transmit end to indicate that the data packet fails to be sent. A PDCP layer at the transmit end retransmits the data packet after receiving the PDCP status report. Alternatively, the PDCP layer at the receive end sends a status report to the transmit end to indicate that the data packet fails to be sent, provided that decompression performed at the receive end fails. A PDCP layer at the transmit end retransmits the data packet after receiving the sent status report. For a data packet carrying a QoS flow ID, the PDCP layer at the transmit end deletes the data packet only after receiving a PDCP status report that is sent by the receive end and that indicates that the data packet is successfully received. The PDCP status report includes a data packet successfully received at the receive end and/or a data packet that fails to be received at the receive end, and includes a PDCP layer sequence number of a data packet. This manner is applicable to a case in which the SDAP header is added to a head and a tail of an SDU at the SDAP layer, or the like.

In this embodiment of this application, the core-network network element may notify the access-network network element of reflective QoS information of a QoS flow or a PDU session, and may instruct the access-network network element to deactivate the reflective QoS characteristic for a QoS flow or a PDU session. The access-network network element may obtain the reflective QoS information, so as to determine whether to send a QoS flow ID through an air interface.

Further, the access-network network element notifies the terminal of reflective QoS information of a QoS flow, a DRB, or a PDU session, and may deactivate the reflective QoS characteristic for a QoS flow, a DRB, or a PDU session. The terminal may determine, based on the reflective QoS information, whether there is a need to read a QoS flow ID through an air interface and whether there is a need to perform an ROHC location offset operation. For a DRB that does not have the reflective QoS characteristic, the terminal does not detect a QoS flow ID, and does not perform an ROHC decompression location offset operation, so as to reduce detection work performed by the terminal for an air-interface data packet and reduce overheads, thereby improving processing efficiency and saving power.

In another reflective QoS characteristic-based communications method provided in this application, a QoS flow ID to be sent through an air interface may be filtered, so as to decrease a quantity of QoS flow IDs to be sent through the air interface, thereby saving signaling overheads. An implementation process of filtering a QoS flow ID to be sent though an air interface may be performed based on the foregoing embodiment, or may be independently performed. This is not limited in this embodiment of this application.

Figure 9:
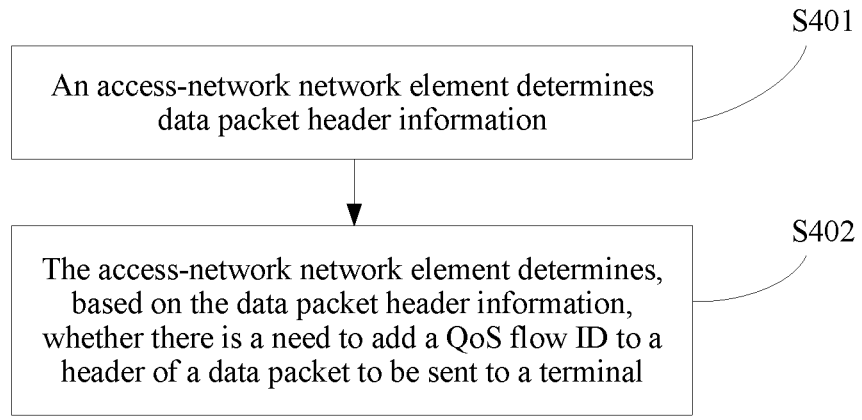
FIG. 9 is a flowchart of still another implementation method of a reflective QoS characteristic-based communications method according to an embodiment of this application.

FIG. 9 is a flowchart of still another implementation method of a reflective QoS characteristic-based communications method according to an embodiment of this application. Referring to FIG. 9, the method includes the following steps:

S401. An access-network network element determines data packet header information.

S402. The access-network network element determines, based on the data packet header information, whether there is a need to add a QoS flow ID to a header of a data packet to be sent to a terminal.

In this embodiment of this application, it is determined whether there is a need to add a QoS flow ID to the header of the data packet to be sent to the terminal, so as to filter a QoS flow ID to be sent through an air interface.

In a possible implementation, a core-network network element sends packet filter composition information to the access-network network element, and the access-network network element determines, based on the corresponding packet filter composition information in the header of the data packet, whether there is a need to add a QoS flow ID to the header of the data packet to be sent to the terminal.

Further, the access-network network element may determine, based on the corresponding packet filter composition information in the header of the data packet, whether there is a need to add, to the header of the data packet to be sent to the terminal, indication information used to indicate that the data packet has a reflective QoS characteristic.

Figure 10:
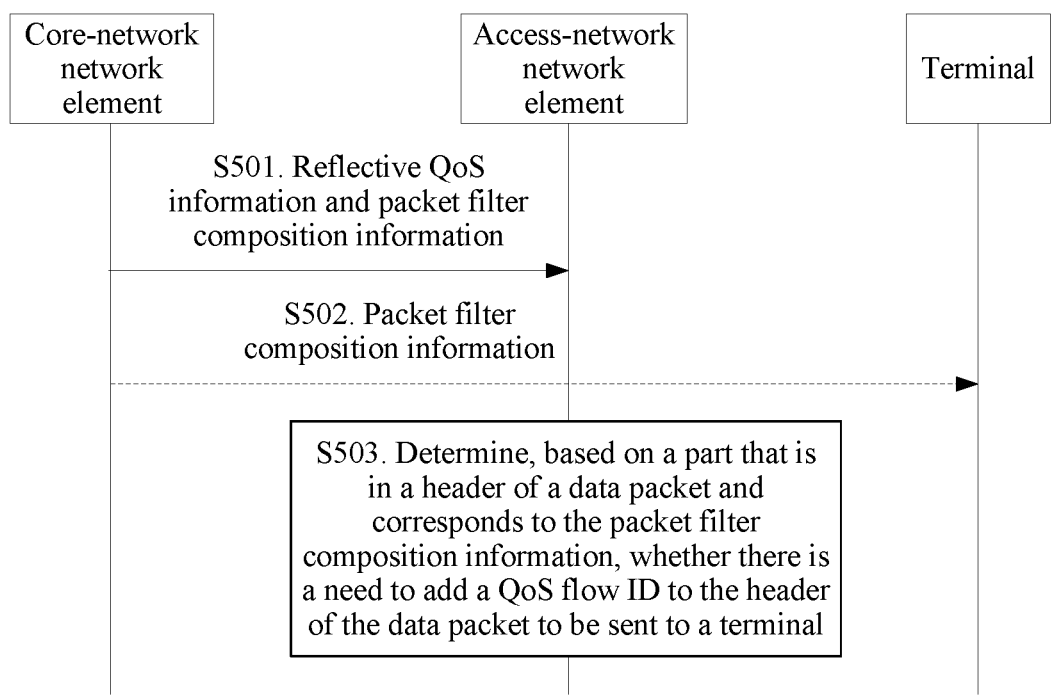
FIG. 10 is a flowchart of an implementation method for filtering a QoS flow ID according to an embodiment of this application.

FIG. 10 is a flowchart of an implementation method for filtering a QoS flow ID according to an embodiment of this application. Referring to FIG. 10, the method includes the following step:

S501. A core-network network element sends reflective QoS information to an access-network network element.

Further, the core-network network element may send packet filter composition information to the access-network network element.

The core-network network element sends the reflective QoS information to the access-network network element, so as to notify the access-network network element of a reflective QoS characteristic of a QoS flow or a PDU session and notify the access-network network element whether a control plane or a user plane is used, so that the access-network network element determines whether all data packets have the reflective QoS characteristic or some data packets have the reflective QoS characteristic.

The packet filter composition information sent by the core-network network element to the access-network network element may be packet filter composition information corresponding to the reflective QoS characteristic of a QoS flow or a PDU session, for example, the packet filter composition information may be an IP quintuple (a source address, a destination address, a source port number, a destination port number, and a protocol number), or a Media Access Control (MAC) source address and a MAC destination address.

In a possible implementation, the method may further include step S502:

S502. The core-network network element may further send the packet filter composition information to a terminal. For example, the core-network network element may notify the terminal of packet filter composition information corresponding to the reflective QoS characteristic of a QoS flow or a PDU session. For example, the packet filter composition information may be an IP quintuple (a source address, a destination address, a source port number, a destination port number, and a protocol number), or a MAC source address and a MAC destination address.

S502 is an optional step.

S503. The access-network network element receives the reflective QoS information and packet filter composition information that are sent by the core-network network element, and determines, based on a part that is in the header of the data packet and corresponds to the packet filter composition information, whether there is a need to add a QoS flow ID to the header of the data packet to be sent to the terminal. Further, the access-network network element may determine whether there is a need to add indication information to the header of the data packet to be sent to the terminal, and the indication information is used to indicate that the data packet has the reflective QoS characteristic.

In a scenario in which all data packets of a QoS flow have the reflective QoS characteristic:

The access-network network element performs packet detection for each data packet, of the QoS flow, that is received from an N3 interface, and detects a header of the data packet based on packet filter composition. For example, if the packet filter composition is an IP quintuple, the access-network network element detects content of the IP quintuple in the header of the data packet. If a part that is in the header of the data packet and corresponds to a packet filter part is new content, for example, the content of the IP quintuple in the header of the data packet is new, it indicates that the access-network network element does not send, through an air interface, a data packet that carries a QoS flow ID and that has the same IP quintuple content. In this case, a QoS flow ID is carried when the data packet is to be sent through the air interface, and indication information may be further carried to indicate that the data packet has the reflective QoS characteristic. Alternatively, if a part that is in the header of the data packet and corresponds to a packet filter is not new, a QoS flow ID is not carried when the data packet is to be sent through the air interface, and indication information used to indicate that the data packet has the reflective QoS characteristic is not carried.

Further, if the access-network network element has acknowledged that the terminal has received a downlink data packet (and the data packet carries a QoS flow ID) whose header includes the same content (the part corresponding to the packet filter), or the access-network network element has successfully sent N downlink data packets that have the same IP quintuple content (N may be set by a network, for example, set by the core-network network element or the access-network network element), the access-network network element does not add a QoS flow ID to the data packet when sending the data packet through the air interface, and does not add, to the data packet, the indication information indicating that the data packet has the reflective QoS characteristic.

In a scenario in which some data packets of a QoS flow have the reflective QoS characteristic:

The access-network network element performs packet detection for a data packet that is received from an N3 interface and that carries the QoS flow ID and an RQI, and detects a header of the data packet based on packet filter composition information. For example, if packet filter composition is an IP quintuple, the access-network network element detects content of the IP quintuple in the header of the data packet. If a part that is in the header of the data packet and corresponds to a packet filter part is new, for example, the content of the IP quintuple in the header of the data packet is new content, it indicates that the access-network network element does not send, through an air interface, a data packet that carries a QoS flow ID and that has the same IP quintuple content. In this case, a QoS flow ID is carried when the data packet is to be sent through the air interface, and indication information may be further carried to indicate that the data packet has the reflective QoS characteristic. If a part that is in the header of the data packet and corresponds to the packet filter composition is not new, a QoS flow ID is not carried when the data packet is to be sent through the air interface.

Further, if the access-network network element has acknowledged that the terminal has received a downlink data packet (and the data packet carries a QoS flow ID) whose header includes the same content (the part corresponding to the packet filter), or the access-network network element has successfully sent the N downlink data packets (N may be set by a network, for example, set by the core-network network element or the access-network network element), the access-network network element does not add a QoS flow ID to the data packet when sending the data packet through the air interface, and does not add, to the data packet, the indication information indicating that the data packet has the reflective QoS characteristic.

In this embodiment of this application, a QoS flow ID to be sent through the air interface is filtered in this manner, so that a quantity of to-be-sent QoS flow IDs is decreased, and operations of detecting a QoS flow ID and obtaining a packet filter by the terminal can be reduced, thereby reducing overheads of the terminal.

In another possible implementation, if the access-network network element determines that there is a need to add a QoS flow ID to the header of the data packet to be sent to the terminal, the access-network network element sends a user plane control PDU or radio resource control RRC signaling to the terminal. The user plane control PDU and the RRC signaling both include a QoS flow ID of the data packet and header information of the data packet.

Figure 11:
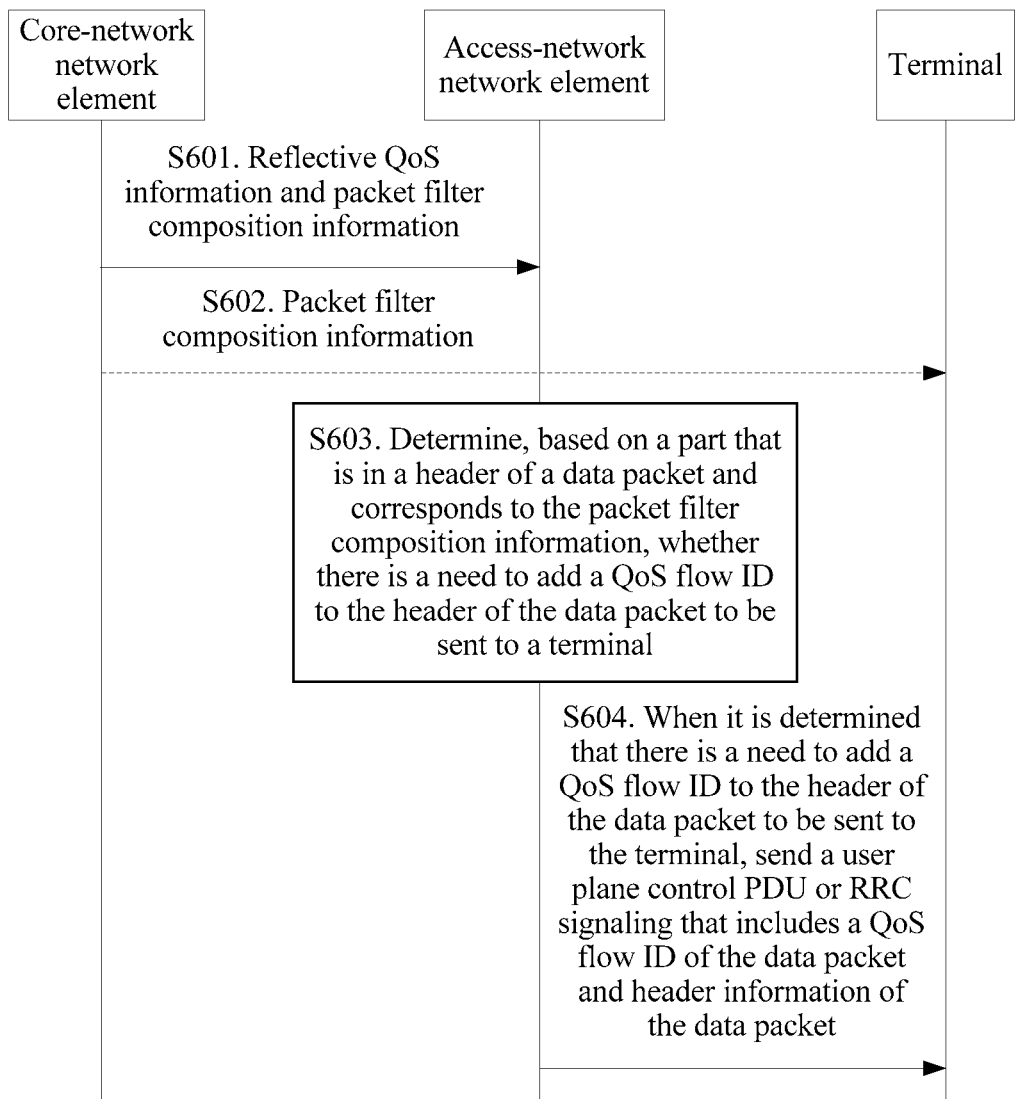
FIG. 11 is a flowchart of another implementation method for filtering a QoS flow ID according to an embodiment of this application.

FIG. 11 is a flowchart of another implementation method for filtering a QoS flow ID according to an embodiment of this application. Referring to FIG. 11, the method includes the following steps.

Execution steps of S601, S602, and S603 are the same as execution steps of S501, S502, and S503. Details are not described herein again, and only a difference is described below.

S604. If the access-network network element determines that there is a need to add a QoS flow ID to the header of the data packet to be sent to the terminal, the access-network network element sends a user plane control PDU (such as an SDAP control PDU or a PDCP control PDU) or RRC signaling (including but not limited an RRC configuration message, an RRC reconfiguration message, or the like) to the terminal, where the user plane control PDU and the RRC signaling both include a QoS flow ID of the data packet and header information of the data packet.

In a scenario in which all data packets of a QoS flow have the reflective QoS characteristic:

The access-network network element performs packet detection for a data packet that is received from an N3 interface and that carries the QoS flow ID and an RQI, and detects a header of the data packet based on packet filter composition information. For example, if packet filter composition is an IP quintuple, the access-network network element detects content of the IP quintuple in the header of the data packet. If a part that is in the header of the data packet and corresponds to a packet filter part is new content, for example, the content of the IP quintuple in the header of the data packet is new content, it indicates that the access-network network element does not send, through an air interface, a data packet that carries a QoS flow ID and that has the same IP quintuple content. In this case, a user plane control PDU/RRC signaling is generated to notify the terminal. The user plane control PDU or the RRC signaling includes the QoS flow ID of the data packet and the header of the data packet, or includes the QoS flow ID of the data packet and partial content (corresponding to the packet filter composition, for example, a source IP address is x, a destination IP address is y, a source port number is 22, a destination port number is 67, and a protocol number is TCP) of the header of the data packet.

If a part that is in the header of the data packet and corresponds to a packet filter part is not new, the user plane control PDU and the RRC signaling are not generated.

Further, if the access-network network element has acknowledged that the terminal has received a user plane control PDU or RRC signaling that includes the same content, the access-network network element no longer sends a user plane control PDU. The access-network network element does not add a QoS flow ID to the data packet when sending the data packet through the air interface.

In a scenario in which some packets of a QoS flow have the reflective QoS characteristic, the access-network network element performs packet detection for only a data packet, of the QoS flow, that is received from an N3 interface and that carries an RQI, and other operations are the same as those specific to the scenario in which all packets of a QoS flow have the reflective QoS characteristic.

In still another possible implementation, if the access-network network element determines that there is a need to add a QoS flow ID to the header of the data packet to be sent to the terminal, the access-network network element performs, based on the packet filter composition information, a reflective operation on content that is in the header of the data packet and corresponds to the packet filter composition information, so as to obtain an uplink packet filter. The access-network network element sends the uplink packet filter and the QoS flow ID to the terminal.

Figure 12:
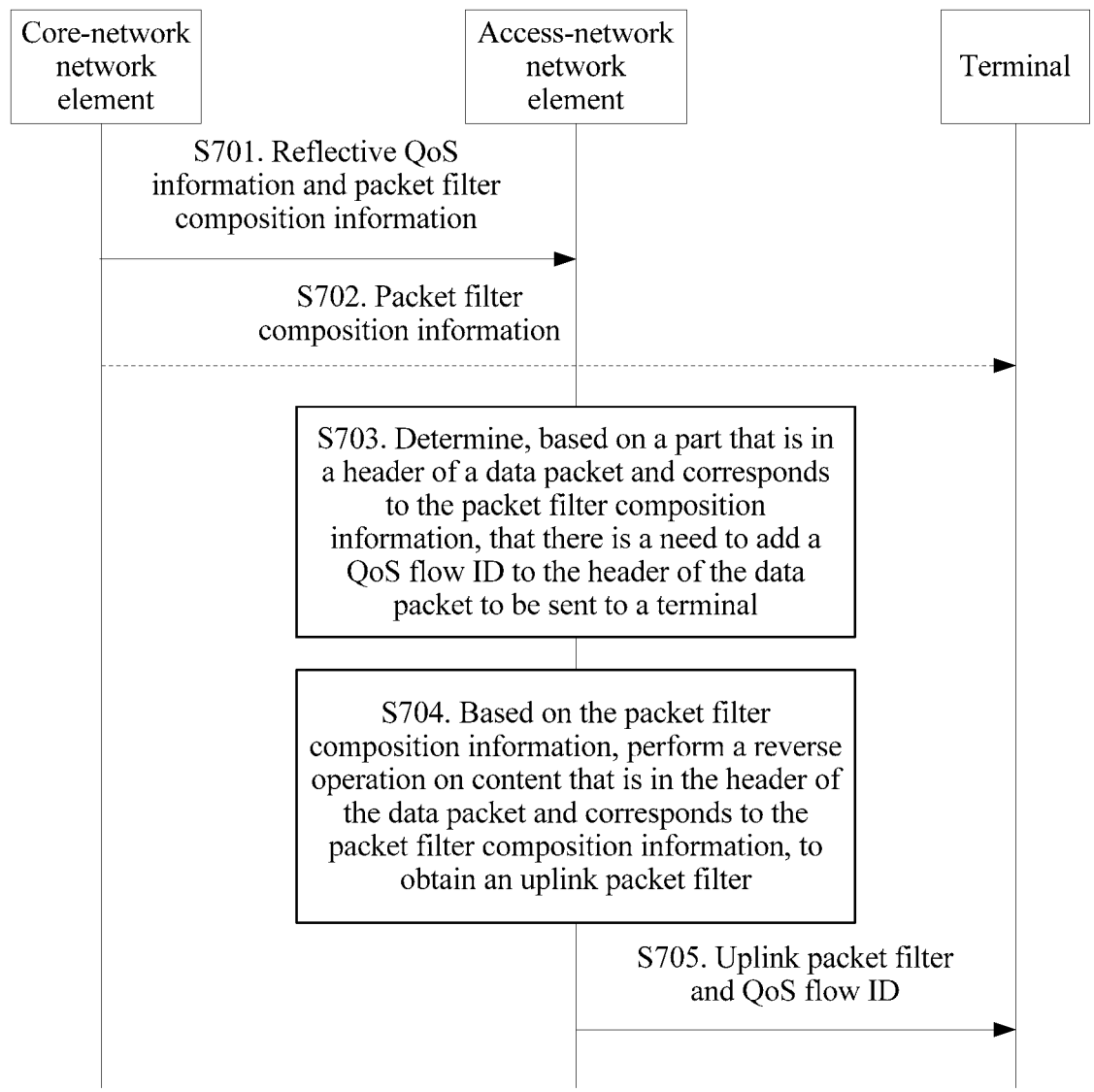
FIG. 12 is a flowchart of still another implementation method for filtering a QoS flow ID according to an embodiment of this application.

FIG. 12 is a flowchart of still another implementation method for filtering a QoS flow ID according to an embodiment of this application. Referring to FIG. 12, the method includes the following steps.

Execution steps of S701, S702, and S703 are the same as execution steps of S501, S502, and S503. Details are not described herein again, and only a difference is described below.

S704. If the access-network network element determines that there is a need to add a QoS flow ID to the header of the data packet to be sent to the terminal, the access-network network element performs, based on the packet filter composition information, a reflective operation on content that is in the header of the data packet and corresponds to the packet filter composition information, so as to obtain an uplink packet filter.

The access-network network element may perform a reflective operation on content that is in a header of a downlink data packet and corresponds to a packet filter, so as to obtain an uplink packet filter. For example, the access-network network element reverses IP quintuple content in the header of the downlink data packet, that is, interchanges a source address and a destination address, and interchanges a source port number and a destination port number, so as to obtain the uplink packet filter. For example, a filter may include the following content: a source IP address is y, a destination IP address is x, a source port number is 67, a destination port number is 22, and a protocol number is TCP.

S705. The access-network network element sends the uplink packet filter and the QoS flow ID to the terminal.

The access-network network element may send the uplink packet filter and the QoS flow ID to the terminal. The access-network network element may notify the terminal of the uplink packet filter and the QoS flow ID by using a user plane control PDU or RRC signaling.

In a possible embodiment, the access-network network element may further notify the terminal that the sent packet filter is an uplink packet filter. The terminal receives the QoS flow ID and the corresponding uplink packet filter, so as to generate an uplink QoS flow.

In this embodiment of this application, the terminal is notified of the uplink QoS flow ID and the corresponding uplink packet filter by using the user plane control PDU or the RRC signaling, so that the access-network network element may not need to send the QoS flow ID by using an air interface, and the terminal does not need to perform operations of detecting the QoS flow ID and obtaining the packet filter, thereby reducing overheads of the terminal to some extent.

Further, in this embodiment of this application, based on the method shown in FIG. 10 to FIG. 12, the terminal may send, to the access-network network element, indication information used to indicate whether the terminal has one or more of a capability of reading a QoS flow ID and a capability of generating an uplink packet filter. Alternatively, the terminal sends, to the access-network network element, indication information used to indicate whether a status of the terminal supports one or more of a capability of reading a QoS flow ID and a capability of generating an uplink packet filter.

Figure 13:
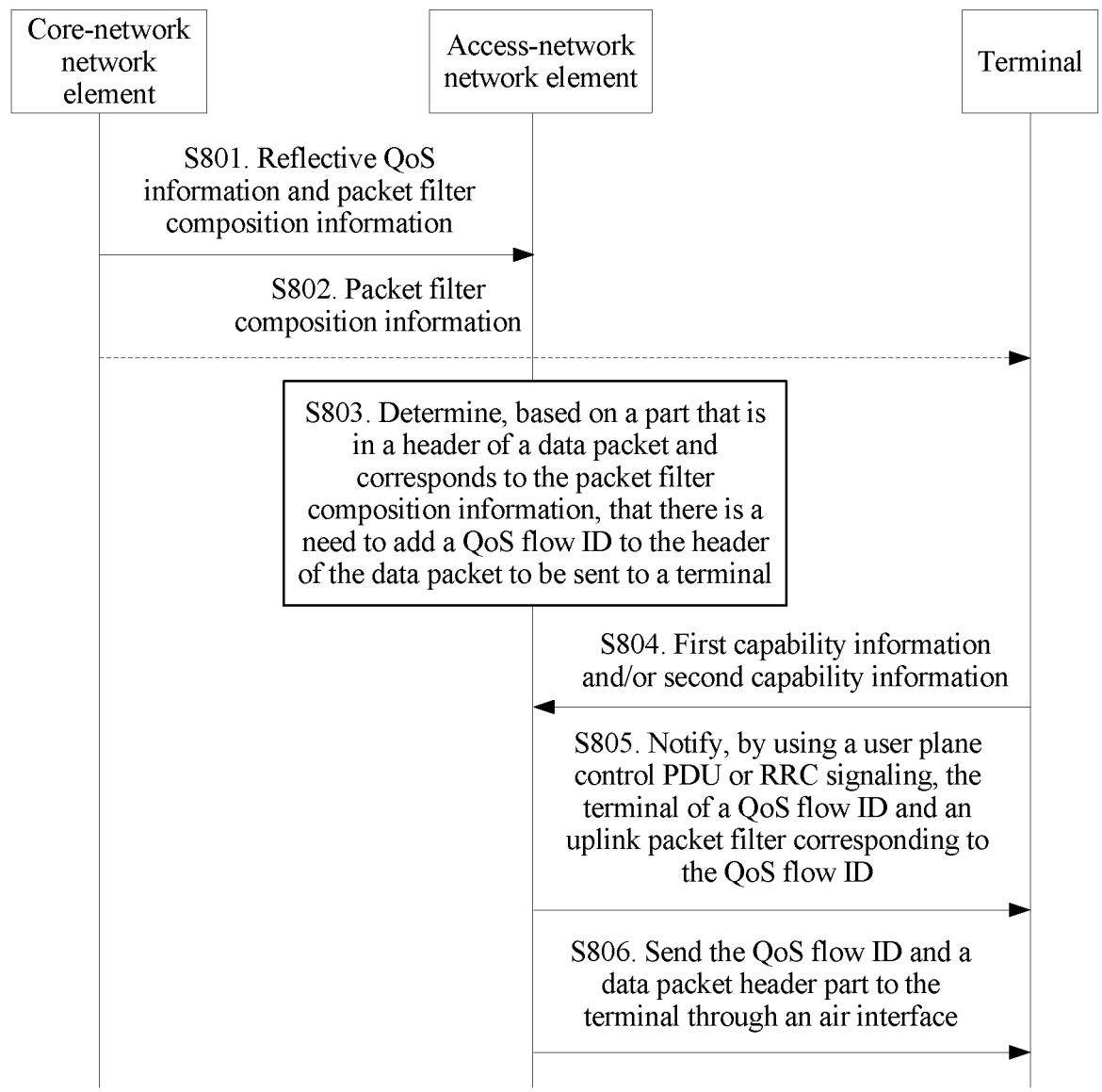
FIG. 13 is a flowchart of still another implementation for filtering a QoS flow ID by an access-network network element according to an embodiment of this application.

FIG. 13 is a flowchart of still another implementation for filtering a QoS flow ID by an access-network network element according to an embodiment of this application. Referring to FIG. 13, the method includes the following steps.

Execution steps of S801, S802, and S803 in FIG. 13 are the same as execution steps of S501, S502, and S503. Details are not described herein again, and only a difference is described below.

S804. The terminal sends first capability information, and the access-network network element receives the first capability information sent by the terminal.

The first capability information is used to indicate whether the terminal has at least one of a capability of reading a QoS flow ID and a capability of generating an uplink packet filter.

The capability of reading a QoS flow ID is a capability of obtaining, by the terminal, a QoS flow ID from a received air-interface data packet. The capability of generating an uplink packet filter is a capability of generating, by the terminal, an uplink packet filter based on a received downlink air-interface data packet.

The terminal may report the first capability information to the access-network network element by using RRC signaling; or the terminal may report the first capability information to the core-network network element, and the core-network network element notifies the access-network network element of the first capability information.

An execution sequence of S801, S802, S803, and S504 is not limited in this embodiment of this application. For example, an execution step of S504 may be before S801, S802, and S803.

Further, the terminal may report a reflective mapping capability. The reflective mapping capability is a capability of obtaining, by the terminal, a mapping relationship between an uplink QoS flow and a DRB based on a QoS flow ID carried in a header of a downlink data packet. For ease of description, the reflective mapping capability reported by the terminal may be referred to as second capability information. The terminal may further send the second capability information, and the access-network network element receives the second capability information sent by the terminal.

The terminal may report the reflective mapping capability information to the access-network network element by using RRC signaling; or the terminal may report the reflective mapping capability information to the core-network network element, and the core-network network element notifies the access-network network element of the reflective mapping capability information.

If the access-network network element determines that the terminal does not support the reflective mapping capability, the access-network network element needs to configure, for the terminal in another manner, the mapping relationship between an uplink QoS flow and a DRB, for example, configure the mapping relationship between an uplink QoS flow and a DRB by using RRC signaling. The RRC signaling may include but is not limited to an RRC configuration message, an RRC reconfiguration message, or the like.

Further, the access-network network element may determine, based on whether the terminal has the capability of reading a QoS flow ID, whether the terminal supports the reflective mapping capability. If the terminal supports the capability of reading a QoS flow ID, the terminal has the reflective mapping capability; or if the terminal does not support the capability of reading a QoS flow ID, the terminal does not have the reflective mapping capability.

S805. If the access-network network element determines that a capability or a status of the terminal does not support the capability of reading a QoS flow ID and a capability of generating an uplink packet filter, the access-network network element notifies, by using a user plane control PDU or RRC signaling, the terminal of a QoS flow ID and an uplink packet filter corresponding to the QoS flow ID.

S806. If the access-network network element determines that the terminal supports the capability of generating an uplink packet filter, the access-network network element may send the QoS flow ID and a data packet header part to the terminal by using an air-interface data packet.

In this embodiment of this application, the access-network network element may notify, by using the user plane control PDU or the RRC signaling, the terminal of the QoS flow ID and the uplink packet filter corresponding to the QoS flow ID, so as to reduce overheads of the terminal and reduce overheads caused if the QoS flow ID is carried through an air interface.

In another reflective QoS characteristic-based communications method provided in this application, the access-network network element may filter the to-be-sent first information used to indicate whether a data packet has the reflective QoS characteristic, so as to save signaling overheads. An implementation process of filtering the first information may be performed based on the foregoing embodiment, or may be independently performed. This is not limited in this embodiment of this application.

Figure 14:
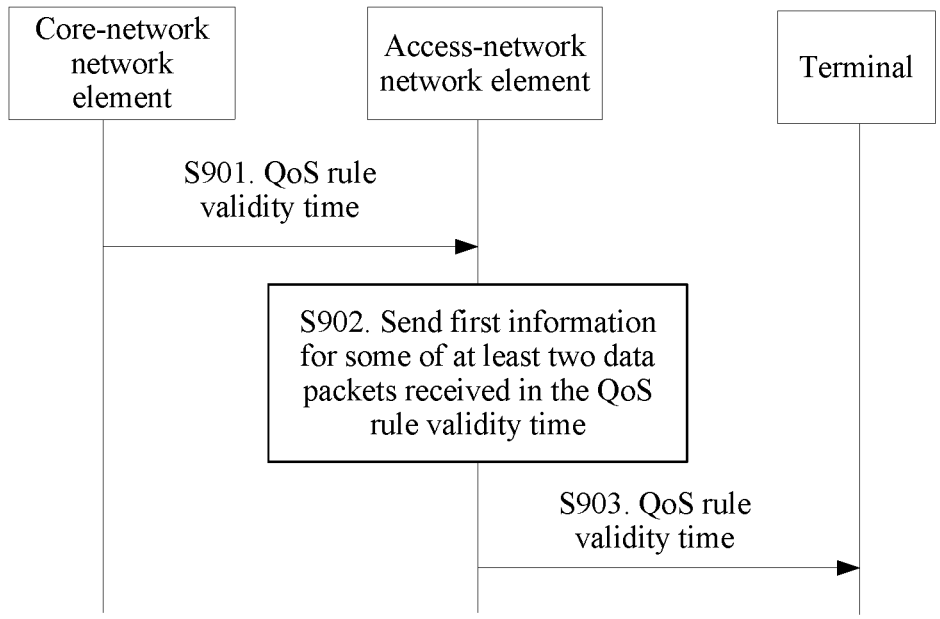
FIG. 14 is a flowchart of yet another implementation method of a reflective QoS characteristic-based communications method according to an embodiment of this application.

FIG. 14 is a flowchart of implementation of another reflective QoS characteristic-based communications method according to an embodiment of this application. Referring to FIG. 14, the method includes the following steps.

S901. A core-network network element sends a QoS rule validity time to an access-network network element.

In this embodiment of this application, the QoS rule validity time is used to indicate activation and deactivation of a QoS rule, and the QoS rule is effective in the QoS rule validity time. The QoS rule is a QoS rule obtained by using a reflective QoS characteristic.

The QoS rule validity time sent by the core-network network element to the access-network network element may be a QoS rule validity time of a QoS flow, or may be a QoS rule validity time of a PDU session.

Specifically, the core-network network element may send a QoS rule validity time of one or more QoS flows to the access-network network element at one time. If the QoS rule validity time sent by the core-network network element to the access-network network element is a QoS rule validity time of a PDU session, the QoS rule validity time of the PDU session is applicable to all QoS flows in the corresponding PDU session that have the reflective QoS characteristic.

The core-network network element may send the QoS rule validity time to the access-network network element by using an N2 interface message. The N2 interface message includes but is not limited to a PDU session setup message (PDU Session Resource Setup), a PDU session modification message (PDU Session Resource Modify), or the like.

S902. The access-network network element receives the QoS rule validity time sent by the core-network network element, and if the access-network network element receives, in the QoS rule validity time, at least two data packets having the reflective QoS characteristic, the access-network network element may send, for some of the at least two data packets in the QoS rule validity time, first information used to indicate whether a data packet has the reflective QoS characteristic.

In this embodiment of this application, if the access-network network element receives a plurality of data packets having the reflective QoS characteristic, and determines that receiving time of the plurality of data packets having the reflective QoS characteristic is in the QoS rule validity time, the access-network network element may send, for only some of the plurality of received data packets, first information used to indicate whether a data packet has the reflective QoS characteristic, and does not need to send the first information for all the data packets, so as to filter the to-be-sent first information and save signaling overheads.

The QoS rule validity time may be implemented by using a timer. For example, if the access-network network element determines that a data packet has the reflective QoS characteristic, the access-network network element generates a QoS rule (including at least one of a QoS rule ID, a QoS flow ID, a packet filter, a priority, or the like) based on this data packet, and starts a timer. If a QoS rule having the same packet filter exists in the access-network network element, the access-network network element may restart the timer. If the timer expires, the corresponding QoS rule is deleted. Before the timer expires, if the access-network network element receives N data packets having the reflective QoS characteristic from a core network user plane network element, the access-network network element may send the first information for M data packets, where M is less than N, and both M and N are positive integers. In this embodiment of this application, the first information used to indicate whether a data packet has the reflective QoS characteristic may include one or more of a QoS flow ID and a non-access stratum reflective QoS indicator (NAS reflective QoS indicator, NRQI).

In this embodiment of this application, for a QoS flow whose reflective QoS is controlled by using a control plane, each data packet received by the access-network network element from the core network user plane network element has the reflective QoS characteristic. Therefore, the access-network network element may filter the first information to be sent for all the received data packets of the QoS flow. However, for a QoS flow whose QoS is controlled by using a user plane, only a data packet that carries an RQI and that is received by the access-network network element from the core network user plane network element has the reflective QoS characteristic. Therefore, the access-network network element may filter the first information to be sent for a received data packet having the reflective QoS characteristic.

S903. The access-network network element may send the QoS rule validity time to a terminal after receiving the QoS rule validity time, so that the terminal maps, in the QoS rule validity time by using a same QoS rule, data packets having the reflective QoS characteristic into a QoS flow.

The QoS rule validity time may be implemented by using a timer. For example, if the terminal determines that a data packet has the reflective QoS characteristic, the terminal generates a QoS rule (including at least one of a QoS rule ID, a QoS flow ID, a packet filter, a priority, or the like) based on this data packet, and starts a timer. If a QoS rule having the same packet filter exists in the terminal, the terminal may restart the timer. If the timer expires, the corresponding QoS rule is deleted.

In still another possible design, the core-network network element may further send QoS rule validity time update information to the access-network network element, and the QoS rule validity time update information is used to indicate an updated QoS rule validity time. The QoS rule validity time update information may be QoS rule validity time update information of a QoS flow, or may be QoS rule validity time update information of a PDU session.

In a cell handover process of the terminal or in a multi-connection process, when a service of the terminal is switched, some or all QoS flows, of the terminal, in a source access-network network element (a source base station) may be switched to a target access-network network element (a target base station). The source access-network network element (the source base station) may send a QoS rule validity time of a to-be-switched QoS flow to the target access-network network element (the target base station) to which the terminal is to be handed over. The target access-network network element may filter, based on the QoS rule validity time, the reflective QoS information to be sent to the terminal, so as to filter the reflective QoS information to be sent to the terminal, thereby saving signaling overheads.

The source access-network network element (the source base station) may send the QoS rule validity time of the to-be-switched QoS flow to the target access-network network element (the target base station) by using a message that includes but is not limited to a handover request message, a secondary base station addition request message, a secondary base station modification request message, or the like.

The QoS rule validity time that may be sent by the source access-network network element to the target access-network network element to which the terminal is to be handed over may be a QoS rule validity time of a QoS flow, or may be a QoS rule validity time of a PDU session.

Further, when sending, in a target cell, a data packet of a QoS flow, the target access-network network element may ignore a QoS rule validity time of a data packet sent by the source access-network network element, and filter the to-be-sent first information based on only a QoS rule validity time corresponding to the data packet sent from the target access-network network element, so as to avoid QoS rule validity time synchronization between the source access-network network element and the target access-network network element.

In still another embodiment of this application, an SDAP frame format in a process in which an SDAP entity transmits a data packet may be optimized so as to send a data packet of the foregoing QoS flow through an air interface, where the SDAP entity is responsible for adding an uplink QoS flow ID and a downlink QoS flow ID to an air-interface protocol stack.

In this embodiment of this application, a transparent-mode SDAP frame format and a non-transparent-mode SDAP frame format may be configured. The transparent-mode SDAP frame format means that no SDAP header is configured for a DRB. In other words, an SDAP PDU does not include SDAP header. The non-transparent-mode SDAP frame format means that an SDAP header is configured for a DRB. In other words, an SDAP PDU includes the SDAP header.

In the embodiments of this application, the transparent-mode SDAP frame format and the non-transparent-mode SDAP frame format are separately described below. The non-transparent-mode SDAP frame format is first described.

Figure 15:
FIG. 15 is a schematic diagram of an SDAP frame format according to an embodiment of this application.

FIG. 15 is a schematic diagram of a downlink SDAP frame format according to an embodiment of this application. Referring to FIG. 15, an SDAP header of the downlink SDAP frame format includes a non-access stratum QoS indicator (NAS reflective QoS indicator, NRQI) field and an access stratum reflective mapping indicator (ARQI) field. The NRQI and the ARQI each may be indicated by using a bit. If a bit used to indicate the NRQI is set to 1, it indicates that the data packet has a reflective QoS characteristic. If a bit used to indicate the NRQI is set to 0, it indicates that the data packet does not have the reflective QoS characteristic. If a bit used to indicate the ARQI is set to 1, it indicates that the QoS flow has a reflective mapping characteristic. If a bit used to indicate the ARQI is set to 0, it indicates that the QoS flow does not have the reflective mapping characteristic.

In FIG. 15, QFI represents a QoS flow identifier, Data represents data, R represents an idle bit, Qct represents a byte, and one byte occupies eight bits.

In a data packet transmission process, when an SDAP entity at a data transmit end sends a data packet, if the SDAP entity determines that the to-be-sent data packet has the reflective QoS characteristic, the SDAP entity sets the bit used to indicate the NRQI to 1; or if the SDAP entity determines that the to-be-sent data packet does not have the reflective QoS characteristic, the SDAP entity sets the bit used to indicate the NRQI to 0. When the SDAP entity at the data transmit end sends a data packet, if the SDAP entity determines that a QoS flow of the to-be-sent data packet has the reflective mapping characteristic, the SDAP entity sets the bit used to indicate the ARQI to 1; or if the SDAP entity determines that a QoS flow of the to-be-sent data packet does not have the reflective mapping characteristic, the SDAP entity sets the bit used to indicate the ARQI to 0.

In a possible embodiment of this application, if the bit used to indicate the NRQI and the bit used to indicate the ARQI both are set to 0, an SDAP header may not carry a QoS flow identifier (QoS flow ID, QFI) field. If at least one of the bit used to indicate the NRQI and the bit used to indicate the ARQI is set to 1, the QFI field is carried.

The SDAP entity at the data transmit end generates the SDAP header in the foregoing manner, and delivers the SDAP header and a data packet received from a UPF to a PDCP layer.

Figure 16:
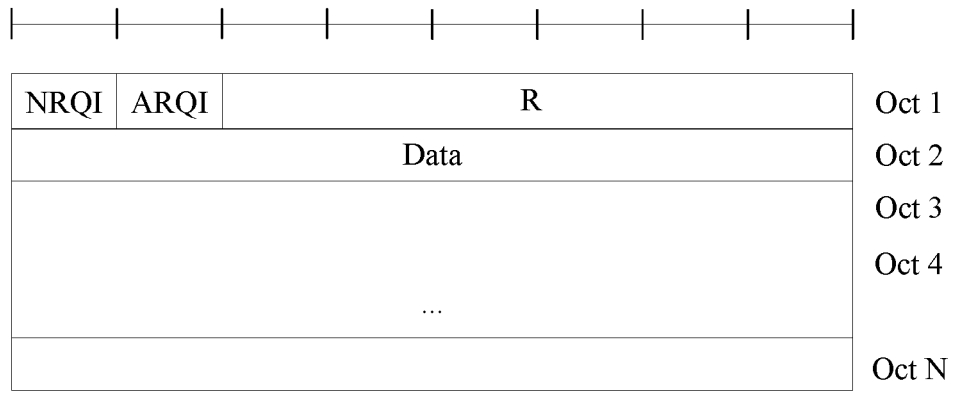
FIG. 16 is another schematic diagram of an SDAP frame format according to an embodiment of this application.

In a data packet transmission process, an SDAP entity at a data receive end receives a PDCP SDU from the PDCP layer, and reads the SDAP header. If a value of the bit used to indicate the NRQI is 1, it indicates that the data packet has the reflective QoS characteristic. In this case, the SDAP entity delivers, to an upper layer such as a NAS layer, a data portion of SDAP and a QoS flow ID that is read from the SDAP header. The data portion and the QoS flow ID that are delivered to the upper layer may be used to generate a QoS rule at the upper layer. Further, the SDAP entity may send the NRQI to the upper layer. If the value of the bit used to indicate the NRQI is 0, it indicates that the data packet does not have the reflective QoS characteristic. The SDAP entity sends only the data portion of SDAP to the upper layer such as the NAS layer. If a value of the bit used to indicate the ARQI is 1, it indicates that the QoS flow has the reflective mapping characteristic, and the SDAP entity generates, based on a downlink QoS flow ID read from the data packet and a DRB ID corresponding to the data packet, a mapping relationship between an uplink QoS flow and a DRB. If the value of the bit used to indicate the ARQI is 0, it indicates that the QoS flow does not have the reflective mapping characteristic. The SDAP entity does not generate the mapping relationship between an uplink QoS flow and a DRB based on the downlink QoS flow ID. If the bit used to indicate the NRQI and the bit used to indicate the ARQI both are set to 0, the SDAP entity may learn that a subsequent part of the SDAP frame format does not carry the QFI field, and may learn a start location of the data packet. For example, as shown in FIG. 16, the SDAP entity may learn that the data portion starts from a second byte.

Figure 17:
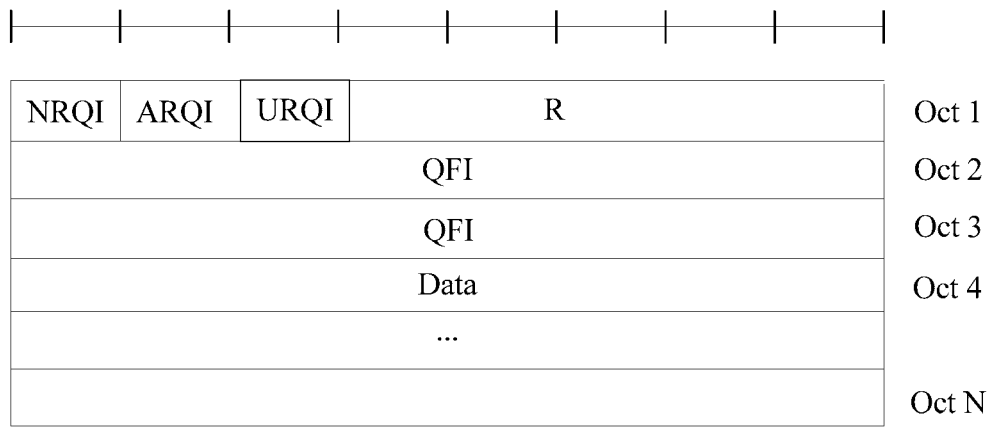
FIG. 17 is still another schematic diagram of an SDAP frame format according to an embodiment of this application.

FIG. 17 is a schematic diagram of a downlink SDAP frame format according to an embodiment of this application. The SDAP frame format shown in FIG. 17 is similar to the SDAP frame format shown in FIG. 15, and a difference lies in that an SDAP header further includes a bit used to indicate user plane reflective QoS flow indication information (UP reflective QoS indicator, URQI). The URQI is used to indicate whether reflective QoS is controlled by using a user plane. In other words, the URQI is used to indicate whether the reflective QoS is indicated by a UPF by adding an RQI to a data packet to be sent through an N3 interface. If the reflective QoS is indicated by the UPF by adding the RQI to the data packet to be sent through the N3 interface, a value of the bit used to indicate the URQI is set to 1; or if the reflective QoS is not indicated by the UPF by adding the RQI to the data packet to be sent through the N3 interface, a value of the bit used to indicate the URQI is set to 0.

In a data packet transmission process, when an SDAP entity at a data transmit end sends a data packet, if the SDAP entity determines that a data packet received from the UPF carries the RQI, the value of the bit used to indicate the URQI is set to 1; or if the SDAP entity determines that a data packet received from the UPF does not carry the RQI, the value of the bit used to indicate the URQI is set to 0. An SDAP entity at a data receive end receives a PDCP SDU from a PDCP layer, and SDAP reads the SDAP header. If a value of a bit used to indicate an NRQI is 1, it indicates that the data packet has a reflective QoS characteristic, and the SDAP entity delivers a data portion of SDAP and a QoS flow ID that is read from the corresponding SDAP header to an upper layer such as a NAS layer. If a value of a bit used to indicate a URQI is 1, the SDAP entity further delivers, to the upper layer, an NRQI corresponding to the data packet.

In the foregoing embodiment of this application, a data packet whose SDAP header carries reflective QoS information of the NAS layer and reflective mapping information of an AS layer may be transferred through an air interface, air-interface overheads may be reduced, and it may be accurately determined whether to deliver RQI indication information to the upper-layer protocol.

In a possible design, in this embodiment of this application, a bit may be further set in the SDAP header, where the bit is used to indicate whether transmission, in a corresponding DRB, of a data packet of a QoS flow ends. For example, an End field is set, and the End field is used to indicate whether transmission, in a corresponding DRB, of a data packet of a QoS flow ends.

Figure 18:
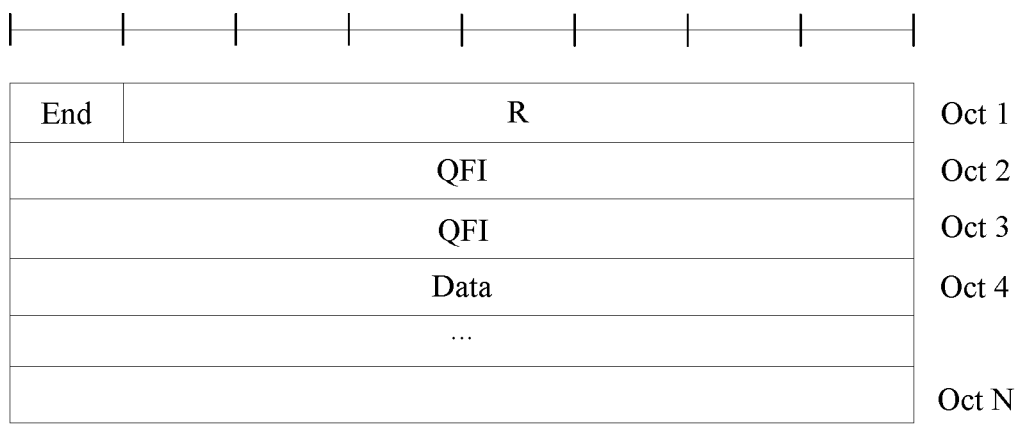
FIG. 18 is yet another schematic diagram of an SDAP frame format according to an embodiment of this application.

FIG. 18 is a schematic diagram of another SDAP frame format according to an embodiment of this application. If a bit used to indicate an End field is set to 1, it indicates that transmission, in a corresponding DRB, of a data packet of the QoS flow ends. If the bit used to indicate an End field is set to 0, it indicates that transmission, in a corresponding DRB, of a data packet of the QoS flow does not end.

In a data packet transmission process, when an SDAP entity at a data transmit end sends a data packet, if the SDAP entity determines to stop sending, in a DRB (such as a DRB 1), a data packet of a QoS flow (such as a QoS flow 1), the SDAP entity sets a bit that is in an SDAP header and that is used to indicate the End field to 1. Alternatively, an SDAP PDU is sent, and the SDAP PDU does not include a data field. In other words, the SDAP PDU is only used to indicate that data transmission, in the DRB, of the data packet of the QoS flow ends. An SDAP entity at a data receive end receives a PDCP SDU from a PDCP layer, and SDAP reads the SDAP header. If the bit used to indicate the End field is set to 1, it indicates that transmission, in the DRB, of the data packet of the QoS flow ends; or if the bit used to indicate the End field is set to 0, it indicates that transmission, in the DRB, of the data packet of the QoS flow does not end.

In this embodiment of this application, if the SDAP entity at the data receive end determines that the bit used to indicate the End field is set to 1, the SDAP entity may feed back a receiving status of the data packet of the QoS flow based on this information, for example, may feed back completion of receiving, in the DRB, of the data packet of the QoS flow.

Further, if the SDAP entity at the data receive end determines that the bit used to indicate the End field is set to 1, the SDAP entity at the data receive end may further sort, based on this information, data packets of a same QoS flow that are received from different DRBs.

It may be understood that this embodiment of this application may be based on the SDAP frame format described in FIG. 15 to FIG. 17, and the End field is set in the SDAP frame format in the foregoing embodiment of this application. An SDAP frame format in which the End field is set may be applied to protocol header design for an uplink SDAP frame format and a downlink SDAP frame format.

Figure 19:
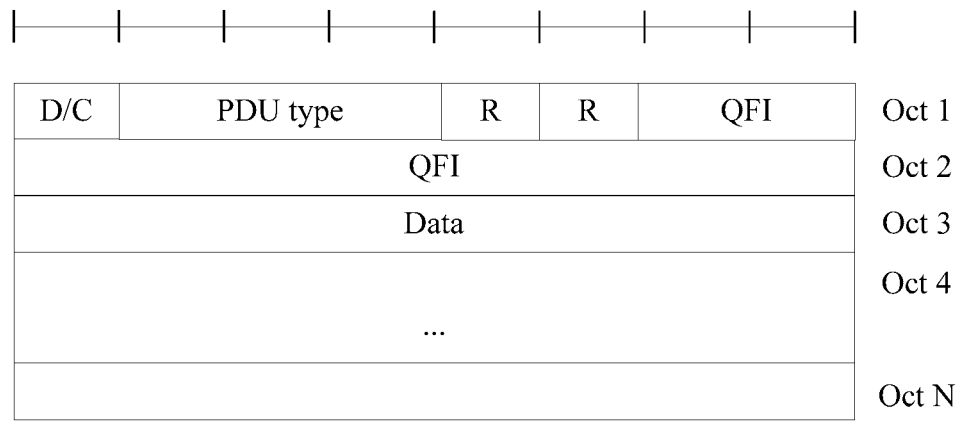
FIG. 19 is still yet another schematic diagram of an SDAP frame format according to an embodiment of this application.

In still another possible design, in this embodiment of this application, a control command may be further set in the SDAP header, where the control command is used to feed back completion of receiving, in a DRB, of a data packet of a QoS flow. FIG. 19 is a schematic diagram of still another SDAP frame format according to an embodiment of this application. In FIG. 19, a D/C field indicates whether the PDU is a control PDU or a data PDU. For example, if a value of a bit used to indicate the D/C field is set to 1, it indicates that the PDU is a control PDU; or if a value of a bit used to indicate the D/C field is set to 0, it indicates that the PDU is a data PDU. A PDU type field indicates a type of a control PDU. For example, a value of the PDU type field is 000, indicating a feedback about completion of receiving, in a DRB, of a data packet of a QoS flow.

In a data packet transmission process, when an SDAP entity at a data transmit end sends a data packet, if the SDAP entity determines that there is a need to send a control PDU, the SDAP entity sets the D/C field to 1, and sets the PDU type field to a value corresponding to a control command, for example, sets the control command used to feed back completion of receiving, in a DRB, of a data packet of a QoS flow to 000. An SDAP entity at a data receive end receives a PDCP SDU from a PDCP layer, and SDAP reads the SDAP header. If the D/C field is 1, it indicates that the SDAP PDU is a control PDU; or if the D/C field is not 1, it indicates that the SDAP PDU is a data PDU. For a control PDU, the SDAP entity at the data receive end reads the PDU type field to obtain a corresponding control command. For example, the value of the PDU type field is 000, indicating a control command used to feed back completion of receiving, in a DRB, of a data packet of a QoS flow.

It may be understood that in FIG. 15 to FIG. 19 in the embodiments of this application, an example in which a length of the QFI is 8 bits is used for description, but the length of the QFI is unnecessarily 8 bits. The embodiments of this application may further include a scenario in which the QFI has another different length.

Further, the QFI in the foregoing embodiment may be a QoS flow ID that is in a NAS layer and that is generated by a terminal or a core network user plane network element, or may be a QoS flow ID that is in an AS layer and that is configured by an access-network network element. There is a mapping relationship between the QoS flow ID in the NAS layer and the QoS flow ID in the AS layer. For example, the QoS flow ID in the NAS layer and the QoS flow ID in the AS layer are in a one-to-one correspondence in a PDU session or a DRB.

The transparent-mode SDAP frame format is described below in the embodiments of this application.

In an embodiment of this application, a transparent-mode SDAP frame format is configured. To be specific, no SDAP header is configured for a DRB, and an SDAP PDU does not include SDAP header. In other words, the SDAP PDU is an SDAP SDU. In this way, overheads caused if the SDAP header is carried through an air interface are reduced, and there is no effect on PDCP ROHC processing.

SDAP is configured based on a DRB. If transparent-mode SDAP is configured in a bidirectional manner, that is, transparent-mode SDAP needs to be configured in both an uplink and a downlink, a mapping relationship between a QoS flow and a DRB is restricted. In a corresponding downlink direction, only a QoS flow whose reflective QoS and reflective mapping are not activated can be mapped to a DRB for which transparent-mode SDAP is configured. In an uplink direction, only a QoS flow that does not carry a QoS flow ID can be mapped to a DRB for which transparent-mode SDAP is configured.

If transparent-mode SDAP is configured based on the mapping relationship between a QoS flow and a DRB, in a scenario in which a QoS flow ID needs to be carried in the uplink direction or the downlink direction, transparent-mode SDAP cannot be configured. As a result, additional air-interface overheads and an effect on ROHC are caused. For example, an offset is made in a PDCP ROHC operation to avoid an SDAP header part. Therefore, in this embodiment of this application, unidirectional transparent-mode SDAP may be configured. To be specific, in this embodiment of this application, unidirectional transparent-mode SDAP may be configured in each of an uplink direction and a downlink direction of a DRB. In other words, transparent-mode SDAP is configured in each of the uplink direction and the downlink direction of the DRB.

If an access-network network element determines to configure transparent-mode SDAP in a downlink direction of at least one DRB, that is, in the downlink direction of the at least one DRB, an SDAP PDU carries no SDAP header, the access-network network element sends, to a terminal, indication information used to indicate configuration of transparent-mode SDAP in the downlink direction of the DRB. For example, the access-network network element may send, to the terminal by using RRC signaling or a user plane control PDU, the indication information used to indicate the configuration of transparent-mode SDAP in the downlink direction of the DRB.

For a DRB for which transparent-mode SDAP is configured in the downlink direction, a corresponding SDAP entity for sending the DRB in the access-network network element routes a data packet received from a core-network network element to the DRB without configuring an SDAP header. In an ROHC compression processing process, a corresponding PDCP entity for sending the DRB in the access-network network element does not perform an initial compression location offset operation caused by the SDAP header.

Further, in this embodiment of this application, the access-network network element maps only a QoS flow whose reflective QoS and reflective mapping are not activated to the DRB for which transparent-mode SDAP is configured.

For the DRB for which transparent-mode SDAP is configured in the downlink direction, a corresponding SDAP entity for receiving the DRB in the terminal does not read an SDAP header, and directly delivers a data packet received from the DRB to an upper layer, such as a NAS layer protocol entity. In an ROHC decompression processing process, a corresponding PDCP entity for receiving the DRB in the terminal does not perform an initial decompression location offset operation caused by the SDAP header.

If the access-network network element determines to configure transparent-mode SDAP in an uplink direction of at least one DRB, that is, in the uplink direction of the at least one DRB, an SDAP PDU carries no SDAP header part, the access-network network element may send, to a terminal by using RRC or a user plane control PDU, indication information used to indicate configuration of transparent-mode SDAP in the uplink direction of the DRB.

The access-network network element maps, to the DRB for which transparent-mode SDAP is configured in the uplink direction, only an uplink QoS flow that does not need to carry a QoS flow ID.

tion to the terminal. The SDAP mode information is used to indicate whether an SDAP frame format is in a transparent mode or a non-transparent mode, and indicate a direction corresponding to an SDAP mode. Further, non-transparent-mode SDAP may be further classified into two sub-modes: An SDAP PDU protocol header has a fixed length, or the SDAP PDU protocol header has a variable length.

The direction corresponding to the SDAP mode is an uplink direction or a downlink direction, or both. Further, no specific direction information may be carried in the SDAP mode information, so as to indicate that the corresponding direction is bidirectional.

Further, the SDAP mode information may be configured in an explicit manner or an implicit manner. For example, an explicit SDAP mode is configured for some DRBs or some directions of some DRBs, and another SDAP mode is configured in the remaining directions of the remaining DRBs or in all directions of the remaining DRBs.

A notification message format is that the SDAP mode information is included in a configuration message of a DRB. For example, the configuration message of the DRB may be configured in the following manners.

In a possible design:

```
DRB list//Description: One or more DRBs may be included;
{DRB ID//Description: an identifier of a DRB;
SDAP mode//Description: an SDAP mode;
Direction//Description: a direction corresponding to an SDAP mode: an uplink direction,
a downlink direction, or both uplink and downlink directions;
}
In another possible design:
An SDAP mode configuration includes an identifier of a DRB to indicate SDAP mode
configuration of the DRB:
SDAP list{
{SDAP ID//Description: an identifier of an SDAP entity;
SDAP mode 1//Description: an SDAP mode, such as a transparent mode; and a direction
corresponding to the mode, such as a downlink direction, may be further included;
{DRB ID list//Description: a list of DRB identifiers;
}
SDAP mode 2//Description: an SDAP mode, such as a transparent mode; and a direction
corresponding to the mode, such as an uplink direction, may be further included;
{DRB ID list//Description: a list of DRB identifiers;
}
SDAP mode 2//Description: an SDAP mode, such as a non-transparent mode; and a
direction corresponding to the mode, such as an uplink direction, may be further included;
{DRB ID list//Description: a list of DRB identifiers;
}
}
```

For the DRB for which transparent-mode SDAP is configured in the uplink, a corresponding SDAP entity for sending the DRB in the terminal delivers a data packet received from a NAS layer to the DRB without configuring an SDAP header. In an ROHC compression processing process, a corresponding PDCP entity for sending the DRB in the terminal does not perform an initial compression location offset operation caused by the SDAP header. A corresponding SDAP entity for receiving the DRB in the access-network network element does not read an SDAP header. In an ROHC decompression processing process, a corresponding PDCP entity for receiving the DRB in the access-network network element does not perform an initial decompression location offset operation caused by the SDAP header.

In this embodiment of this application, after a transparent mode or a non-transparent mode is configured for an SDAP frame format, in a data transmission process, the access-network network element may send SDAP mode informa- Further, the access-network network element may configure an SDAP mode based on a granularity of a PDU session. To be specific, the access-network network element may configure an SDAP mode of a DRB for a PDU session. In other words, if only one SDAP mode is configured in an uplink direction, a downlink direction, or both uplink and downlink directions of an SDAP entity, the SDAP entity uses this SDAP mode for all DRBs corresponding to the PDU session.

Further, in a cell handover process of the terminal, a source access-network network element (a source base station) may send, to a target access-network network element (a target base station), SDAP mode information corresponding to a DRB, so that the target access-network network element (the target base station) may consider the SDAP mode information of the data packet in the following processing processes: determining an SDAP PDU format, determining whether to perform an initial location offset operation during decompression processing for ROHC compression, determining a mapping relationship between a QoS flow and a DRB, and so on.

In a possible design, when the source base station determines to hand over the terminal to a target cell of the target base station, the source base station sends a handover request message 1 to the target base station, and includes, in the handover request message 1, SDAP mode information of a DRB of the terminal. The SDAP mode information is configured for the terminal by the source base station in a source cell. The handover request message 1 may be sent by using a direct interface or an indirect interface between the base stations. The target base station receives the handover request message 1 from the source base station, and may reference the SDAP mode information, included in the handover request message 1, of the DRB of the terminal when performing one or more of the following operations: determining an SDAP PDU format, determining whether to perform an initial location offset operation during decompression processing for ROHC compression, determining a mapping relationship between a QoS flow and a DRB, and so on. For example, when a mapping relationship between a QoS flow and a DRB is configured in the target cell, a QoS flow that does not need to carry a QoS flow ID through an air interface may be mapped to a DRB for which transparent-mode SDAP is configured. Further, the target base station may update a DRB configuration, for example, update an SDAP mode configuration of the DRB based on the SDAP mode information, included in the handover request message 1, of the DRB of the terminal. Further, the target base station includes, in a handover request acknowledgment message 2, SDAP mode information that is of the DRB of the terminal and that is in the target cell.

After receiving the handover request message, the target base station may send the handover request acknowledgment message 2. The target base station may send the handover request acknowledgment message 2 by using the direct interface or the indirect interface between the base stations. The source base station receives the handover request acknowledgment message 2, and then sends a handover command message 3 to the terminal. The terminal receives the handover command, and accesses the target cell.

Further, SDAP mode information may also be transferred in a multi-connection offloading scenario. The multi-connection offloading scenario means that the terminal accesses a communications network such as a 5G network by using a master gNB (MgNB) and a secondary gNB (SgNB). The terminal may receive user plane data from a core network by using the master gNB or the secondary gNB. The terminal may also send data to the core network by using the master gNB or the secondary gNB.

In a QoS flow migration process, the master gNB may migrate a QoS flow from the master gNB to the secondary gNB, or from the secondary gNB to the master gNB. The master gNB may notify the secondary gNB of SDAP mode information of a DRB corresponding to a to-be-migrated QoS flow of the terminal. The secondary gNB may consider the SDAP mode information of the DRB during the following processing: determining an SDAP PDU format, determining whether to perform an initial location offset operation during decompression processing for ROHC compression, determining a mapping relationship between a QoS flow and a DRB, and so on. The master gNB determines to migrate some QoS flows of the terminal to the secondary gNB, and the master gNB sends a QoS flow migration request message 1, and includes, in the QoS flow migration request message 1, the SDAP mode information of the DRB of the terminal. The SDAP mode information is configured by the master gNB for the terminal. The QoS flow migration means migrating a QoS flow from the master gNB to the secondary gNB for sending or for offloading in the secondary gNB. The offloading in the secondary gNB means offloading a downlink data packet from the secondary gNB to the master gNB. The terminal receives data in the master gNB and the secondary gNB. The terminal sends data to the master gNB and secondary gNB in an uplink direction, and the secondary gNB receives data from the terminal and the master gNB, and sends the data to a core network user plane device. The master gNB may send the QoS flow migration request message 1 to the secondary gNB by using a message that includes but is not limited to an SGNB addition request message, an SGNB modification request message, or the like. All QoS flows mapped to a DRB may be migrated, or some QoS flows mapped to a DRB may be migrated.

The secondary gNB receives the QoS flow migration request message 1 from the master gNB, and sends a QoS flow migration request message 2. The secondary gNB may reference the SDAP mode information, included in the QoS flow migration request message 1, of the DRB of the terminal when performing one or more of the following operations: determining an SDAP PDU format, determining whether to perform an initial location offset operation during decompression processing for ROHC compression, determining a mapping relationship between a QoS flow and a DRB, and so on. For example, when a mapping relationship between a QoS flow and a DRB is configured in the secondary gNB, a QoS flow that does not need to carry a QoS flow ID through an air interface may be mapped to a DRB for which transparent-mode SDAP is configured. Further, the secondary gNB may update a DRB configuration, for example, update an SDAP mode configuration of the DRB based on the SDAP mode information, included in the QoS flow migration request message 1, of the DRB of the terminal. Further, the master gNB includes, in the QoS flow migration request acknowledgment message 2, SDAP mode information that is of the DRB of the terminal and that is in the secondary gNB. The terminal receives data, of the downlink QoS flow, sent by the secondary gNB or data offloaded from the secondary gNB. The terminal sends, in the secondary gNB, data of an uplink QoS flow.

Likewise, when the secondary gNB migrates a QoS flow to the master gNB, the secondary gNB may notify the master gNB of SDAP mode information of a DRB corresponding to a to-be-migrated QoS flow of the terminal.

In still another embodiment of this application, a core-network network element may set a public QoS profile at a PDU session level. The public QoS profile includes at least one of the following parameters: a resource type, a priority, a packet delay, a packet error rate, an allocation and retention priority, or the like. The resource type includes a guaranteed bit rate (GBR) or a non-GBR (Non-GBR).

In a process of establishing and modifying a PDU session, the core-network network element sends a public QoS profile of the PDU session to an access-network network element. For example, the core-network network element may send the public QoS profile of the PDU session to the access-network network element through an N2 interface by using a message that includes but is not limited to a PDU Session Resource Setup message, a PDU Session Resource Modify message, or the like. When establishing a default DRB of the PDU session, the access-network network element configures a parameter of the default DRB based on the public QoS profile, for example, a PDCP layer parameter corresponding to the DRB, an RLC layer parameter corresponding to the DRB, or the like. The access-network network element may accept PDU session establishment based on the public QoS profile of the PDU session. If the access-network network element can accept the PDU session establishment, the access-network network element accepts a PDU session establishment request; or if the access-network network element cannot accept the PDU session establishment, the access-network network element refuses to establish the PDU session.

If a public QoS profile of a PDU session is modified, the access-network network element modifies, based on content of the public QoS profile, a parameter of a default DRB corresponding to the PDU session. The access-network network element may accept PDU session establishment based on the public QoS profile of the PDU session. If the access-network network element can accept the PDU session establishment, the access-network network element accepts a PDU session establishment request; or if the access-network network element cannot accept the PDU session establishment, the access-network network element refuses to establish the PDU session.

Further, in a cell handover process of the terminal, the access-network network element may send a public QoS profile of a PDU session to a target access-network network element, for example, send the public QoS profile of the PDU session in a handover request message.

The target access-network network element receives the public QoS profile of the PDU session, and establishes, based on content of the QoS profile, a default DRB corresponding to the PDU session. The target access-network network element may accept PDU session establishment based on the public QoS profile of the PDU session. If the target access-network network element can accept the PDU session establishment, the target access-network network element accepts a PDU session establishment request; or if the target access-network network element cannot accept the PDU session establishment, the target access-network network element refuses to establish the PDU session.

In a data offloading architecture, when a master access-network network element (such as a master gNB) determines to migrate a PDU session or some QoS flows in a PDU session to a secondary access-network network element (such as a second gNB), the master access-network network element sends a public QoS profile of the PDU session to the secondary access-network network element. The master access-network network element may use a message that includes but is not limited to an SGNB addition request (SGNB addition request) message, an SGNB modification request message, or the like. The secondary access-network network element may configure a parameter of a default DRB based on the public QoS profile of the PDU session, and may further accept PDU session establishment based on the public QoS profile of the PDU session.

In this embodiment of this application, an implementation in which the core-network network element may set a public QoS profile at a PDU session level may be applied to a secondary cell load (second cell group bearer, SCG Bearer) scenario and a split load (split Bearer) scenario.

In still another embodiment of this application, optimization for in-order transmission of a data packet of a QoS flow is provided. A core-network network element notifies an access-network network element of in-order transmission information of a QoS flow or a PDU session. The in-order transmission information means whether packets of the QoS flow or the PDU session need to be transmitted in order. A core network control plane network element may notify the access-network network element of the in-order transmission information of the QoS flow or the PDU session by using an N2 interface message. The used N2 interface message includes but is not limited to a PDU Session Resource Setup message, a PDU Session Resource Modify message, or the like. Further, the core-network network element may notify a terminal of the in-order transmission information of the QoS flow or the PDU session, for example, by using a NAS layer message. The QoS flow includes an uplink QoS flow or a downlink QoS flow.

Further, a core network user plane network element may notify a RAN of the in-order transmission information of the QoS flow or the PDU session through an N3 interface. For example, the core network user plane network element adds, to an encapsulation header of a data packet at the N3 interface, indication information used to indicate whether the data packet needs to be transmitted in order.

Considering in-order transmission information of a data packet, specifically, the RAN mainly uses the following manners to transmit a data packet through an air interface.

Implementation 1 of the RAN: A QoS flow is mapped to a DRB based on in-order transmission information.

The RAN may map a QoS flow to a DRB based on in-order transmission information of a QoS flow or a PDU session. The RAN may map, to a same DRB, QoS flows that do not need to be transmitted in order. To be specific, none of data in the DRB needs to be transmitted in order. For example, the RAN maps, to a same DRB, a plurality of QoS flows that have a same QoS parameter or similar QoS parameters and that do not need to be transmitted in order. Alternatively, the RAN maps, to a same DRB, QoS flows that need to be transmitted in order. To be specific, all data in the DRB needs to be transmitted in order.

For an uplink, a base station notifies the terminal of a mapping relationship between a QoS flow and a DRB. Further, the base station notifies the terminal that data in a DRB needs to be transmitted out of order. For example, the base station notifies the terminal by using an RRC message or a user plane control PDU. The terminal may perform optimization processing when sending the data in the DRB.

For a downlink, if the base station notifies the terminal that data in a DRB needs to be transmitted out of order, a PDCP layer entity, in the terminal, that corresponds to the DRB does not need to perform a sorting operation, and the PDCP layer protocol entity can directly deliver a data packet received from an RLC layer to an upper-layer protocol without performing a sorting operation on the data packet.

In this manner, different processing may be performed between the base station and the terminal based on an in-order transmission requirement of a DRB, and a PDCP layer may not perform a sorting operation on a DRB that needs to be transmitted out of order, so as to improve processing efficiency.

Implementation 2 of the RAN: In-order transmission information is not considered for mapping a QoS flow to a DRB.

In this scenario, a DRB may include data packets that need to be transmitted in order and data packets that do not need to be transmitted in order.

For Implementation 2 of the RAN, this application provides three technical solutions that are separately described below.

Solution 1: Indication information is added to an SDAP header.

An SDAP entity at a transmit end obtains in-order transmission information of a packet, and adds indication information to an SDAP header, so as to indicate whether the packet needs to be transmitted in order. An SDAP PDU is sent to a receive end after being processed at a PDCP layer, an RLC layer, a MAC layer, a physical layer, or the like. A PDCP layer entity at the receive end reads the SDAP header of the received PDCP SDU, and learns the in-order transmission information based on the indication information in the SDAP header. If the data packet needs to be transmitted out of order, the PDCP layer entity directly delivers the data packet to an upper layer; or if the data packet needs to be transmitted in order, the PDCP layer entity sorts the PDCP SDU based on a PDCP SN, and sequentially delivers the data packet to an upper layer after the data packet is sorted. In another manner, the PDCP layer entity reads an SDAP header of only a PDCP SDU received out of order, to learn the in-order transmission information.

For example, the PDCP receives a data packet 1, a data packet 3, and a data packet 5. If the data packet 3 does not need to be delivered in order, the PDCP layer entity delivers the data packet 1 and the data packet 3 to the upper layer, and makes a record indicating that the data packet 3 has been delivered to the upper layer. The PDCP entity stores the data packet 5 at a PDCP layer, and when the PDCP entity receives a data packet 2 and a data packet 4, and the data packet 2 and the data packet 4 both need to be delivered in order, the PDCP entity delivers the data packet 2, the data packet 4, and the data packet 5 to an upper layer. The PDCP layer may read SDAP headers of only the data packet 3 and the data packet 5 that are out of order, to learn in-order transmission information.

This solution may be applied to uplink and downlink directions.

Solution 2: Indication information is added to a PDCP layer protocol header.

An SDAP entity at a transmit end obtains in-order transmission information of a packet, and notifies a PDCP layer of the in-order transmission information of the data packet by using an SDAP layer primitive and a PDCP layer primitive. A PDCP layer entity adds indication information to a PDCP layer protocol header, to indicate whether the data packet needs to be transmitted in order. A PDCP PDU is sent to a receive end after being processed at an RLC layer, a MAC layer, a physical layer, or the like. A PDCP layer entity at the receive end reads the PDCP layer protocol header of the received PDCP SDU, to learn the in-order transmission information. If the data packet needs to be transmitted out of order, the PDCP layer entity directly delivers the data packet to an upper layer; or if the data packet needs to be transmitted in order, the PDCP layer entity sorts the PDCP SDU based on a PDCP SN, and sequentially delivers the data packet to an upper layer after the data packet is sorted. In another manner, the PDCP layer entity reads a PDCP protocol header of only a PDCP SDU received out of order, to learn the in-order transmission information.

For example, the PDCP receives a data packet 1, a data packet 3, and a data packet 5. If the data packet 3 does not need to be delivered in order, the PDCP layer entity delivers the data packet 1 and the data packet 3 to the upper layer, and makes a record indicating that the data packet 3 has been delivered to the upper layer. The PDCP entity stores the data packet 5 at a PDCP layer, and when the PDCP entity receives a data packet 2 and a data packet 4, and the data packet 2 and the data packet 4 both need to be delivered in order, the PDCP entity delivers the data packet 2, the data packet 4, and the data packet 5 to an upper layer. The PDCP layer may read PDCP protocol headers of only the data packet 3 and the data packet 5 that are out of order, to learn in-order transmission information; or read partial content of a PDCP layer protocol header, such as in-order transmission indication information.

This solution may be applied to uplink and downlink directions.

Solution 3: A PDCP entity at a receive end reads a QoS flow ID at an SDAP layer.

An SDAP entity at a transmit end adds a QoS flow ID to an SDAP header, and a PDCP PDU is sent to a receive end after being processed at an RLC layer, a MAC layer, a physical layer, or the like. A PDCP layer entity at the receive end reads an SDAP layer protocol header part of the received PDCP SDU, to learn the QoS flow ID, and learns in-order transmission information of a data packet based on in-order transmission information that is of a QoS flow and that is notified by the core-network network element to the RAN. If the data packet needs to be transmitted out of order, the PDCP layer entity directly delivers the data packet to an upper layer; or if the data packet needs to be transmitted in order, the PDCP layer entity sorts the PDCP SDU based on a PDCP SN, and sequentially delivers the data packet to an upper layer after the data packet is sorted. In another manner, the PDCP layer entity reads an SDAP layer protocol header of only a PDCP SDU received out of order, and reads a QoS flow ID from the SDAP layer protocol header, to learn in-order transmission information.

For example, the PDCP layer receives a data packet 1, a data packet 3, and a data packet 5. If the data packet 3 does not need to be delivered in order, the PDCP layer entity delivers the data packet 1 and the data packet 3 to the upper layer, and makes a record indicating that the data packet 3 has been delivered to the upper layer. The PDCP entity stores the data packet 5 at a PDCP layer, and when the PDCP entity receives a data packet 2 and a data packet 4, and the data packet 2 and the data packet 4 both need to be delivered in order, the PDCP entity delivers the data packet 2, the data packet 4, and the data packet 5 to an upper layer. The PDCP layer may read SDAP layer protocol headers of only the data packet 3 and the data packet 5 that are out of order, and reads a QoS flow ID to learn in-order transmission information.

This solution may be applied to an uplink direction.

In this manner, different processing may be performed between the base station and the terminal based on in-order transmission requirements of different data packets in a DRB, and the PDCP layer may not perform a sorting operation on a data packet that does not need to be transmitted in order, so as to improve processing efficiency. The PDCP layer performs a sorting operation on a data packet that needs to be transmitted in order, so as to ensure in-order transmission requirement of a service.

In a possible implementation of this application, if cell handover for the terminal occurs, a source access-network network element (a source base station) that obtains the reflective QoS information may send the obtained reflective QoS information to a target access-network network element (a target base station) to which the terminal is to be handed over. The source access-network network element may send the reflective QoS information to the target access-network network element by using a handover request message, and the target access-network network element performs steps in the foregoing embodiment that are related to the access-network network element. For example, the target access-network network element may receive the reflective QoS information sent by the source access-network network element, and performs one or more of the following operations based on the reflective QoS information: determining whether to send a QoS flow ID through an air interface, configuring whether the terminal needs to read a QoS flow ID, configuring, for the terminal, a manner of configuring a mapping relationship between a QoS flow and a DRB, determining whether to configure an SDAP entity for a PDU session, and so on.

Further, in a multi-connection scenario, an MgNB determines to migrate some QoS flows to an SgNB. The MgNB sends reflective QoS information of the QoS flows to the SgNB. For example, the MgNB sends the reflective QoS information of the QoS flows by using a message such as an SGNB addition request message or an SGNB modification request (SGNB MODIFICATION REQUEST) message, so that the SgNB may perform one or more of the following operations based on the reflective QoS information: determining whether to send a QoS flow ID through an air interface, configuring whether the terminal needs to read a QoS flow ID, configuring, for the terminal, a manner of configuring a mapping relationship between a QoS flow and a DRB, determining whether to configure an SDAP entity for a PDU session, and so on.

Only functions of the SDAP protocol and the PDCP protocol in this embodiment of this application are described, and any protocol layer names corresponding to the same functions are included.

It should be noted that, in the specification, claims, and accompanying drawings of this application, the terms "first", "second", and the like are intended to distinguish between similar objects but do not necessarily indicate a specific order or sequence. For example, the first indication information and the second indication information in the embodiments of this application are merely for ease of description and distinguishing between different indication information, and are not intended to limit the indication information. It should be understood that the data termed in such a way is interchangeable in proper circumstances so that the embodiments of this application described herein can be implemented in other orders than the order illustrated or described herein.

The foregoing describes the solutions provided in the embodiments of this application mainly from a perspective of a terminal, an access-network network element, and a core-network network element. It may be understood that to implement the foregoing functions, the terminal, the access-network network element, and the core-network network element include corresponding hardware structures and/or software structures for performing the functions. With reference to units and algorithm steps of each example described in the embodiments disclosed in this application, the embodiments of this application may be implemented in a form of hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the technical solutions of the embodiments of this application.

In the embodiments of this application, the terminal, the access-network network element, and the core-network network element may be divided into functional units according to the foregoing method examples. For example, a functional unit corresponding to each function may be obtained through division, or two or more functions may be integrated into one processing unit. The integrated unit may be implemented in a form of hardware, or may be implemented in a form of a software functional unit. It should be noted that the unit division in the embodiments of this application is an example, and is merely logical function division and may be another division manner in an actual implementation.

Figure 20:
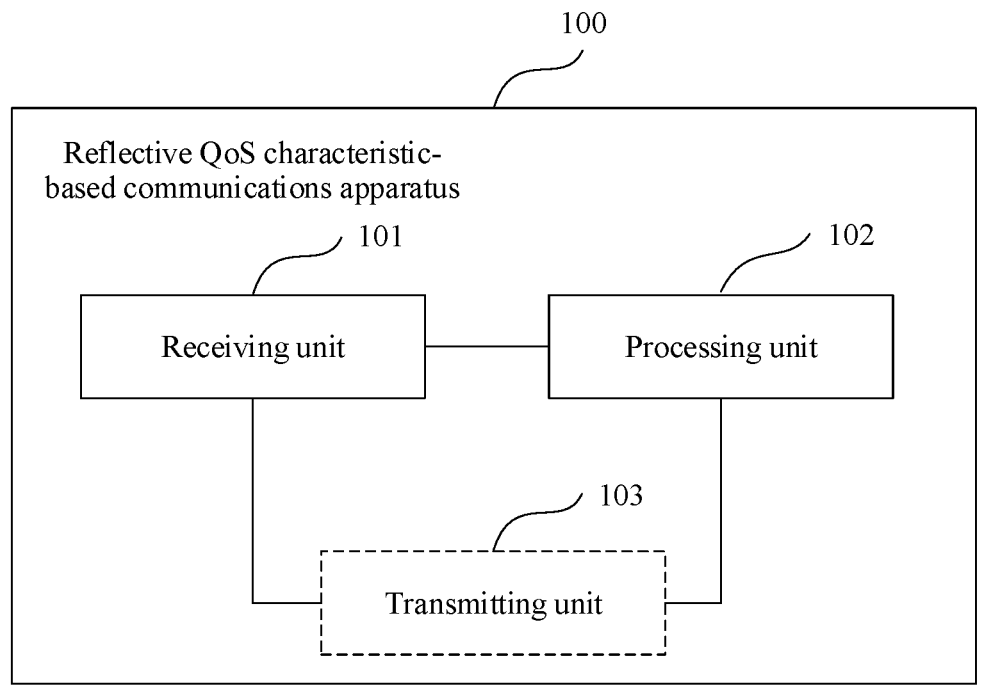
FIG. 20 is a schematic structural diagram of a reflective QoS characteristic-based communications apparatus according to an embodiment of this application.

Based on the foregoing methods, when an integrated unit is used, FIG. 20 is a schematic structural diagram of a reflective QoS characteristic-based communications apparatus 100 according to an embodiment of this application. The reflective QoS characteristic-based communications apparatus 100 may correspond to the access-network network element in the foregoing methods. Referring to FIG. 20, the reflective QoS characteristic-based communications apparatus 100 includes a receiving unit 101 and a processing unit 102. The reflective QoS characteristic-based communications apparatus 100 may further include a transmitting unit 103.

Functions of the receiving unit 101, the processing unit 102, and the transmitting unit 103 may correspond to the foregoing method steps, and details are not described herein again.

When a form of hardware is used for implementation, the receiving unit 101 may be a receiver, a communications interface, and a transceiver circuit, the processing unit 102 may be a processor or a controller, and the transmitting unit 103 may be a transmitter, a communications interface, and a transceiver circuit. The communications interface is a general term, and may include one or more interfaces.

Figure 21:
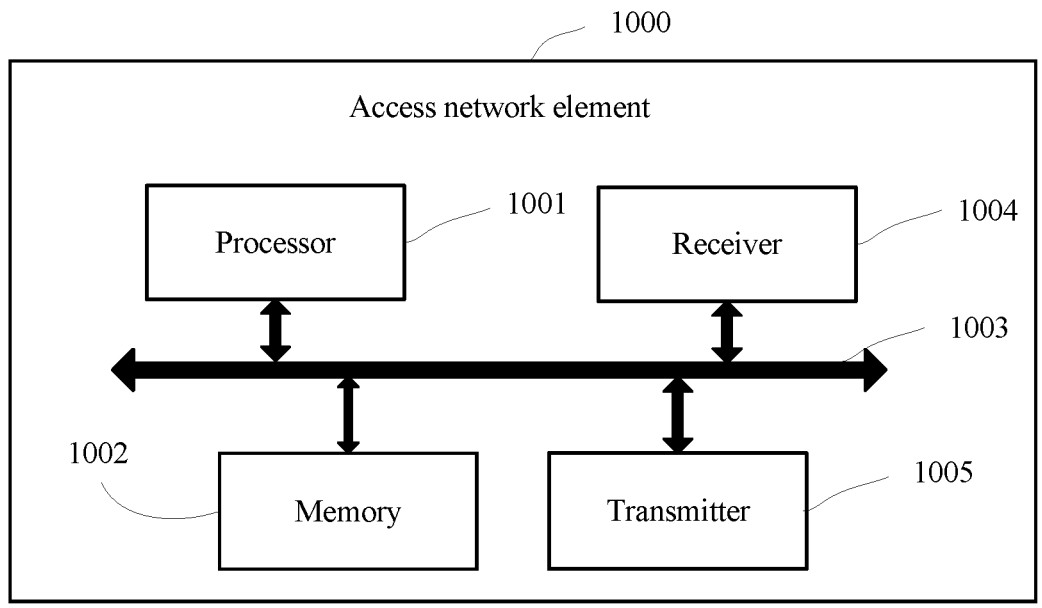
FIG. 21 is a schematic structural diagram of an access-network network element according to an embodiment of this application.

Based on the foregoing methods, FIG. 21 shows another schematic structural diagram of the reflective QoS characteristic-based communications apparatus 100 according to an embodiment of this application. The reflective QoS characteristic-based communications apparatus may correspond to the access-network network element in the foregoing methods. The access-network network element may be a base station or another device, and this is not limited herein.

Referring to FIG. 21, an access-network network element 1000 includes a processor 1001, a memory 1002, a bus system 1003, a receiver 1004, and a transmitter 1005. The processor 1001, the memory 1002, the receiver 1004, and the transmitter 1005 are connected to each other by using the bus system 1003. The memory 1002 is configured to store an instruction. The processor 1001 is configured to execute the instruction stored in the memory 1002, to control the receiver 1004 to receive a signal and control the transmitter 1005 to send a signal, so as to complete steps of the access-network network element in the foregoing methods. The receiver 1004 and the transmitter 1005 may be a same physical entity or different physical entities. When the receiver 1004 and the transmitter 1005 are a same physical entity, the receiver 1004 and the transmitter 1005 may be collectively referred to as a transceiver. The memory 1002 may be integrated into the processor 1001, or may be separated from the processor 1001.

In an implementation, functions of the receiver 1004 and the transmitter 1005 may be implemented by using a transceiver circuit or a dedicated chip. The processor 1001 may be implemented by using a dedicated processing chip, a processing circuit, a processor, or a universal chip.

In another implementation, a general-purpose computer may be considered to implement the access-network network element provided in this embodiment of this application. To be specific, program code for implementing functions of the processor 1001, the receiver 1004, and the transmitter 1005 is stored in the memory. A general-purpose processor executes the code in the memory to implement the functions of the processor 1001, the receiver 1004, and the transmitter 1005.

For concepts, explanations, detailed descriptions, and other steps that are related to the reflective QoS characteristic-based communications apparatus 100 and the access-network network element 1000, refer to descriptions about the content in the foregoing methods or in another embodiment. Details are not described herein again.

Figure 22:
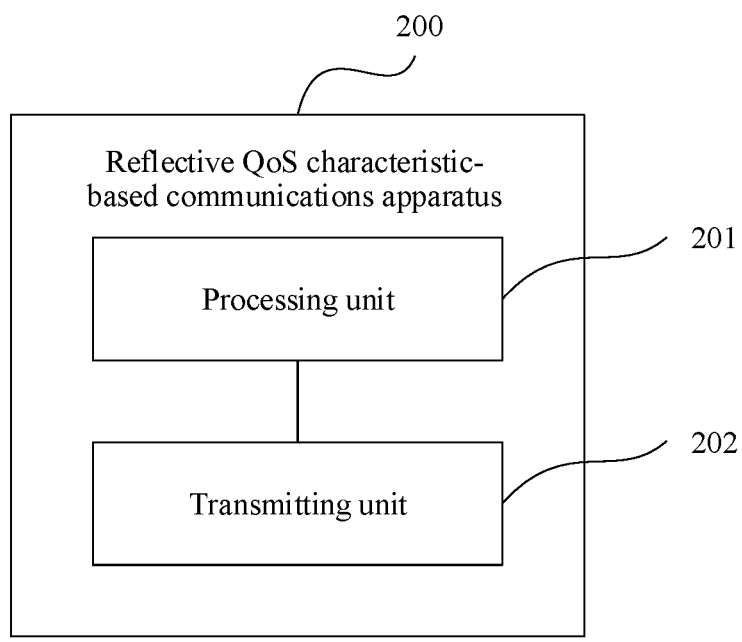
FIG. 22 is a schematic structural diagram of another reflective QoS characteristic-based communications apparatus according to an embodiment of this application.

Based on the foregoing methods, when an integrated unit is used, FIG. 22 shows a schematic structural diagram of a reflective QoS characteristic-based communications apparatus 200 according to an embodiment of this application. The reflective QoS characteristic-based communications apparatus 200 may correspond to the core-network network element in the foregoing methods. Referring to FIG. 22, the reflective QoS characteristic-based communications apparatus 200 includes a processing unit 201 and a transmitting unit 202. Functions of the processing unit 201 and the transmitting unit 202 may correspond to the foregoing method steps, and details are not described herein again.

When a form of hardware is used for implementation, the processing unit 201 may be a processor or a controller, and the transmitting unit 202 may be a transmitter, a communications interface, and a transceiver circuit. The communications interface is a general term, and may include one or more interfaces.

Figure 23:
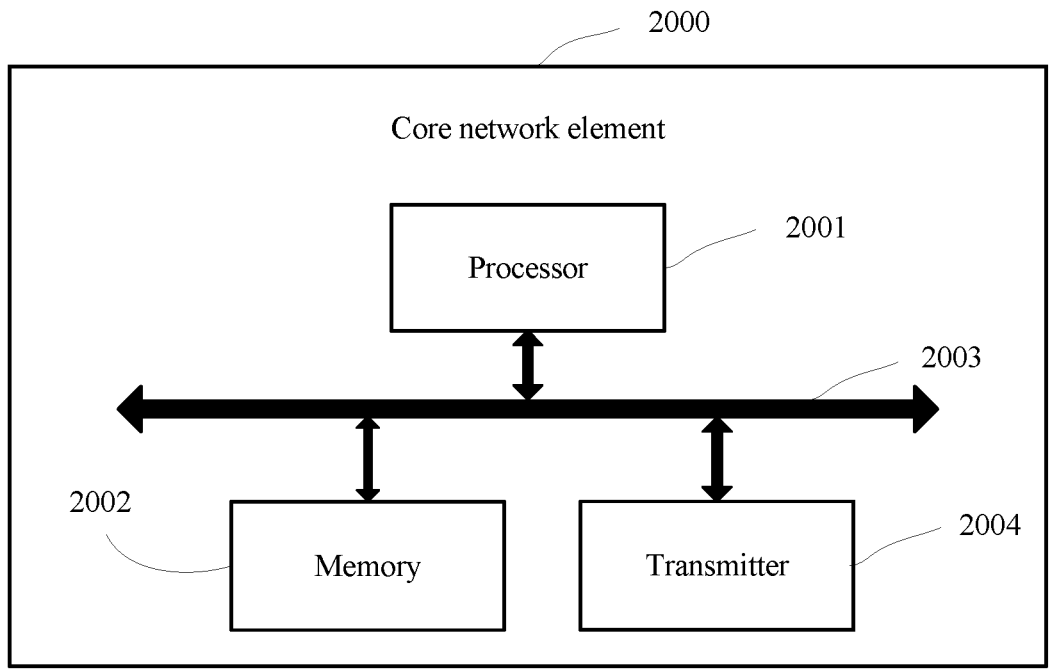
FIG. 23 is a schematic structural diagram of a core-network network element according to an embodiment of this application.

Based on the foregoing methods, FIG. 23 shows another schematic structural diagram of the reflective QoS characteristic-based communications apparatus 200 according to an embodiment of this application. The reflective QoS characteristic-based communications apparatus may correspond to the core-network network element in the foregoing methods. The core-network network element may be an AMF, a UMF, or another device, and this is not limited herein.

Referring to FIG. 23, a core-network network element 2000 includes a processor 2001, a memory 2002, a bus system 2003, and a transmitter 2004. The processor 2001, the memory 2002, and the transmitter 2004 are connected to each other by using the bus system 2003. The memory 2002 is configured to store an instruction. The processor 2001 is configured to execute the instruction stored in the memory 2002, to control the transmitter 2004 to send a signal, so as to complete steps of the core-network network element in the foregoing methods. The transmitter 2004 may be collectively referred to as a transceiver. The memory 2002 may be integrated into the processor 2001, or may be separated from the processor 2001.

In an implementation, a function of the receiver 2004 may be implemented by using a transceiver circuit or a dedicated chip. The processor 2001 may be implemented by using a dedicated processing chip, a processing circuit, a processor, or a universal chip.

In another implementation, a general-purpose computer may be considered to implement the core-network network element provided in this embodiment of this application. To be specific, program code for implementing functions of the processor 2001 and the transmitter 2004 is stored in the memory. A general-purpose processor executes the code in the memory to implement the functions of the processor 2001 and the transmitter 2004.

For concepts, explanations, detailed descriptions, and other steps that are related to the reflective QoS characteristic-based communications apparatus 200 and the core-network network element 2000, refer to descriptions about the content in the foregoing methods or in another embodiment. Details are not described herein again.

Figure 24:
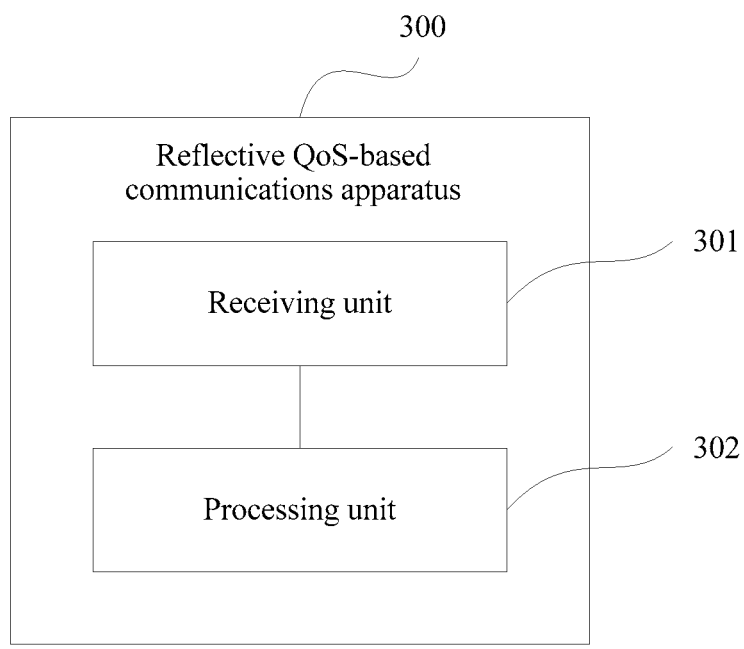
FIG. 24 is a schematic structural diagram of still another reflective QoS characteristic-based communications apparatus according to an embodiment of this application.

Based on the foregoing methods, when an integrated unit is used, FIG. 24 shows a schematic structural diagram of a reflective QoS characteristic-based communications apparatus 300 according to an embodiment of this application. The reflective QoS characteristic-based communications apparatus 300 may correspond to the terminal in the foregoing methods. Referring to FIG. 24, the reflective QoS characteristic-based communications apparatus 300 includes a receiving unit 301 and a processing unit 302. Functions of the receiving unit 301 and the processing unit 302 may correspond to the foregoing method steps, and details are not described herein again.

When a form of hardware is used for implementation, the processing unit 302 may be a processor or a controller, and the receiving unit 301 may be a receiver, a communications interface, and a transceiver circuit. The communications interface is a general term, and may include one or more interfaces.

Figure 25:
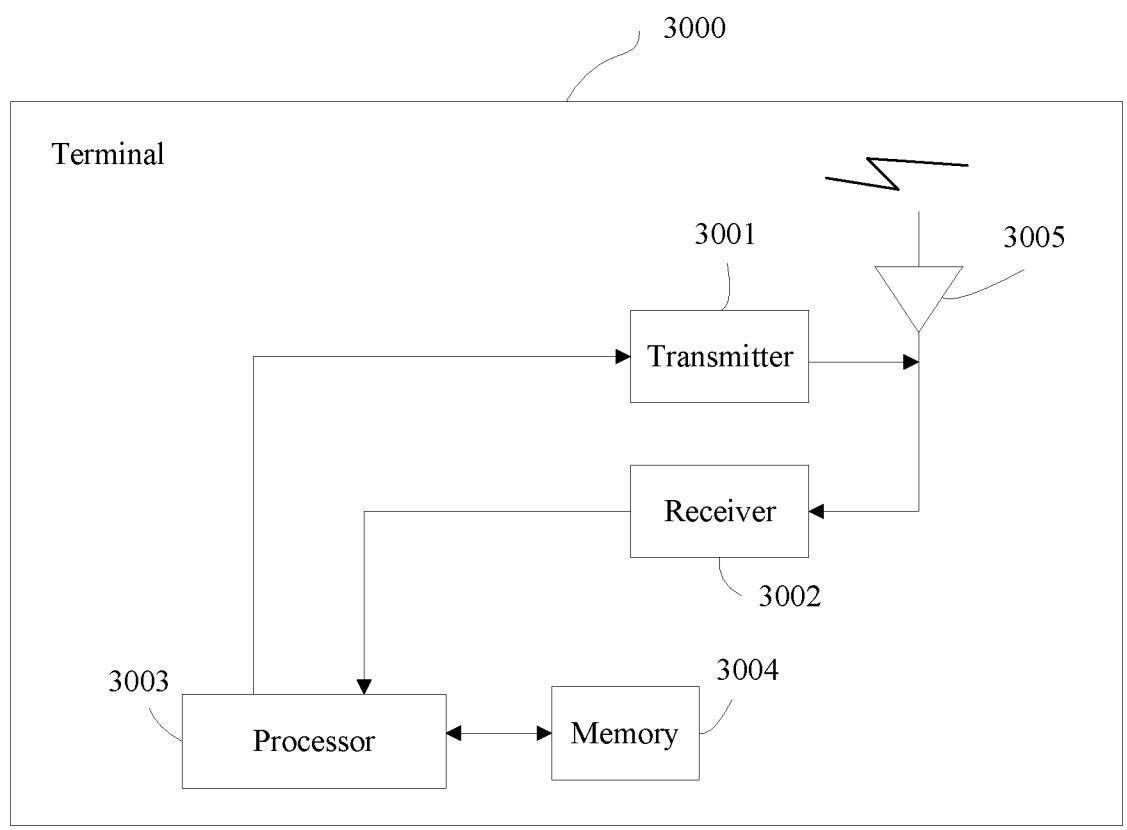
FIG. 25 is a schematic structural diagram of a terminal according to an embodiment of this application.

Based on the foregoing methods, FIG. 25 shows another schematic structural diagram of the reflective QoS characteristic-based communications apparatus 300 according to an embodiment of this application. The reflective QoS characteristic-based communications apparatus 300 may correspond to the terminal in the foregoing methods.

Referring to FIG. 25, a terminal 3000 may include a transmitter 3001, a receiver 3002, a processor 3003, and a memory 3004. Further, the terminal 3000 may include an antenna 3005. The transmitter 3001, the receiver 3002, the processor 3003, and the memory 3004 may be connected to each other by using a bus system. The memory 3004 is configured to store an instruction. The processor 3003 is configured to execute the instruction stored in the memory 3004, to control the receiver 3002 to receive a signal and control the transmitter 3001 to send a signal, so as to complete steps of the terminal in the foregoing methods. The receiver 3002 and the transmitter 3001 may be a same physical entity or different physical entities. When the receiver 3002 and the transmitter 3001 are a same physical entity, the receiver 3002 and the transmitter 3001 may be collectively referred to as a transceiver. The memory 3004 may be integrated into the processor 3003, or may be separated from the processor 3003.

In an implementation, functions of the receiver 3002 and the transmitter 3001 may be implemented by using a transceiver circuit or a dedicated chip. The processor 3003 may be implemented by using a dedicated processing chip, a processing circuit, a processor, or a universal chip.

In another implementation, a general-purpose computer may be considered to implement the terminal provided in this embodiment of this application. To be specific, program code for implementing functions of the processor 3003, the receiver 3002, and the transmitter 3001 is stored in the memory. A general-purpose processor executes the code in the memory to implement the functions of the processor 3003, the receiver 3002, and the transmitter 3001.

For concepts, explanations, detailed descriptions, and other steps that are related to the reflective QoS characteristic-based communications apparatus 300 and the terminal 3000, refer to descriptions about the content in the foregoing methods or in another embodiment. Details are not described herein again.

Based on the methods provided in the embodiments of this application, an embodiment of this application further provides a communications system, and the communications system includes the foregoing access-network network element and core-network network element, and one or more terminals.

Based on the methods provided in the embodiments of this application, an embodiment of this application further provides a computer storage medium, configured to store some instructions. When these instructions are executed, any method related to the terminal, the access-network network element, or the core-network network element may be completed.

Based on the methods provided in the embodiments of this application, an embodiment of this application further provides a computer program product, configured to store a computer program. The computer program is used to perform the reflective QoS characteristic-based communications methods in the foregoing method embodiments.

It should be understood that in the embodiments of this application, the processor may be a central processing unit (CPU), or the processor may be another general-purpose processor, a digital signal processor (DSP), an application-specific integrated circuit (ASIC), a field programmable gate array (FPGA), another programmable logic device, discrete gate or transistor logic device, discrete hardware component, or the like. The general-purpose processor may be a microprocessor, or the processor may be any conventional processor or the like.

The memory may include a read-only memory and a random access memory, and provide an instruction and data to the processor 310. A part of the memory may further include a non-volatile random access memory. For example, the memory may further store information of a device type.

The bus system may include a power bus, a control bus, a status signal bus, and the like in addition to a data bus. However, for clear description, various types of buses in the figures are marked as the bus system.

In an implementation process, steps in the foregoing methods can be implemented by using a hardware integrated logical circuit in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims

What is claimed is:

1. A communication method for handover, comprising:
sending, by a source access-network network element, a handover request message to a target access-network network element, wherein the handover request message comprises an identifier (ID) of a data radio bearer (DRB) and information indicating whether to configure a Service Data Adaptation Protocol (SDAP) header for the DRB; and receiving, by the source access-network network element, a handover request acknowledgement message sent by the target access-network network element.

2. The communication method according to claim 1, wherein the information indicating whether to configure the SDAP header for the DRB comprises information indicating whether to configure the SDAP header in an uplink direction of the DRB.

3. The communication method according to claim 1, wherein the information indicating whether to configure the SDAP header for the DRB comprises information indicating whether to configure the SDAP header in a downlink direction of the DRB.

4. The communication method according to claim 1, wherein the handover request message further comprises reflective quality of service (reflective QoS) information.

5. The communication method according to claim 1, wherein the information indicating whether to configure the SDAP header for the DRB is configured by the source access-network network element for a terminal.

6. The communication method according to claim 1, wherein the handover request message is sent by using a direct interface between the source access-network element and the target access-network network element.

7. A communication apparatus, comprising a transmitter configured to:
send a handover request message to a target access-network network element, wherein the handover request message comprises an identifier (ID) of a data radio bearer (DRB) and information indicating whether to configure a Service Data Adaptation Protocol (SDAP) header for the DRB; and
a receiver configured to receive a handover request acknowledgement message from the target access-network network element.

8. The communication apparatus according to claim 7, wherein the information indicating whether to configure the SDAP header for the first DRB comprises information indicating whether to configure the SDAP header in an uplink direction of the DRB.

9. The communication apparatus according to claim 7, wherein the information indicating whether to configure the SDAP header for the DRB comprises information indicating whether to configure the SDAP header in a downlink direction of the DRB.

10. The communication apparatus according to claim 7, wherein the handover request message further comprises reflective quality of service (reflective QoS) information.

11. The communication apparatus according to claim 7, wherein the information indicating whether to configure the SDAP header for the first DRB is configured by a source access-network network element for a terminal.

12. The communication apparatus according to claim 7, wherein the handover request message is sent by using a direct interface between a source access-network element and the target access-network network element.

13. A communication apparatus, comprising:
a receiver configured to receive a handover request message from a source access-network network element, wherein the handover request message comprises an identifier (ID) of a data radio bearer (DRB) and information indicating whether to configure a Service Data Adaptation Protocol (SDAP) header for the DRB; and
a transmitter configured to send a handover request acknowledgement message to the source access-network network element.

14. The communication apparatus according to claim 13, wherein the information indicating whether to configure the SDAP header for the DRB comprises information indicating whether to configure the SDAP header in an uplink direction of the DRB.

15. The communication apparatus according to claim 13, wherein the information indicating whether to configure the SDAP header for the DRB comprises information indicating whether to configure the SDAP header in a downlink direction of the DRB.

16. The communication apparatus according to claim 13, wherein the handover request message further comprises reflective quality of service (reflective QoS) information.

17. The communication apparatus according to claim 13, wherein the information indicating whether to configure the SDAP header for the DRB is configured by the source access-network network element for a terminal.

18. The communication apparatus according to claim 13, wherein the handover request message is sent by using a direct interface between the source access-network element and a target access-network network element.

* * * * *